United States Patent
Dankberg et al.

(10) Patent No.: US 10,044,637 B2
(45) Date of Patent: *Aug. 7, 2018

(54) OPPORTUNISTIC DELIVERY OF CACHEABLE CONTENT IN A COMMUNICATIONS NETWORK

(71) Applicant: ViaSat, Inc., Carlsbad, CA (US)

(72) Inventors: Mark D. Dankberg, Encinitas, CA (US); Daniel M. Newman, Littleton, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,104

(22) Filed: May 21, 2015

(65) Prior Publication Data

US 2016/0021021 A1 Jan. 21, 2016

Related U.S. Application Data

(63) Continuation of application No. 14/470,336, filed on Aug. 27, 2014, now Pat. No. 9,065,906, which is a
(Continued)

(51) Int. Cl.
*H04H 20/71* (2008.01)
*H04L 12/927* (2013.01)
(Continued)

(52) U.S. Cl.
CPC ....... *H04L 47/805* (2013.01); *H04B 7/18517* (2013.01); *H04B 7/18584* (2013.01);
(Continued)

(58) Field of Classification Search
CPC ... H04W 4/06; H04W 72/05; H04W 72/0446; H04L 67/325; H04L 47/805;
(Continued)

(56) References Cited

U.S. PATENT DOCUMENTS

| | | |
|---|---|---|
| 5,408,470 A | 4/1995 | Rothrock |
| 5,740,367 A | 4/1998 | Spilo |

(Continued)

FOREIGN PATENT DOCUMENTS

| | | |
|---|---|---|
| EP | 2536065 A2 | 12/2012 |
| WO | WO-2001/061886 A2 | 8/2001 |

(Continued)

OTHER PUBLICATIONS

International Search Report and Written Opinion dated Jan. 21, 2014, 11 pages.

(Continued)

*Primary Examiner* — Sai Ming Chan

(57) ABSTRACT

Systems and methods are described for using opportunistically delayed delivery of content to address sub-optimal bandwidth resource usage in network infrastructures that allow subscribers to share forward link resources. According to some embodiments, content is identified as delayable and assigned to a delaycast queue and/or service flow. For example, a server system of a satellite communications system identifies content that can be delayed to exploit future excess link capacity through multicasting and to exploit subscriber-side storage resources. Some implementations attempt to exploit any excess link resources at any time, while others exploit unused bandwidth only during certain times or when a certain threshold of resources is available. Various embodiments also provide content scoring and/or other prioritization techniques for optimizing exploitation of the delaycast queue.

19 Claims, 10 Drawing Sheets

Related U.S. Application Data continuation of application No. 13/831,008, filed on Mar. 14, 2013, now Pat. No. 8,848,535, which is a continuation of application No. 13/569,811, filed on Aug. 8, 2012, now Pat. No. 8,432,808.

(60) Provisional application No. 61/660,577, filed on Jun. 15, 2012.

(51) Int. Cl.
| | |
|---|---|
| H04B 7/185 | (2006.01) |
| H04W 4/06 | (2009.01) |
| H04L 29/08 | (2006.01) |
| H04M 3/42 | (2006.01) |
| H04W 72/00 | (2009.01) |
| H04W 72/04 | (2009.01) |

(52) U.S. Cl.
CPC ....... *H04B 7/18595* (2013.01); *H04L 47/801* (2013.01); *H04L 67/325* (2013.01); *H04M 3/42178* (2013.01); *H04W 4/06* (2013.01); *H04W 72/005* (2013.01); *H04W 72/0446* (2013.01)

(58) Field of Classification Search
CPC .............. H04L 47/801; H04B 7/18584; H04B 7/18595; H04B 7/18517
USPC ....................................................... 370/312
See application file for complete search history.

(56) References Cited

U.S. PATENT DOCUMENTS

| | | |
|---|---|---|
| 5,870,754 A | 2/1999 | Dimitrova et al. |
| 5,905,981 A | 5/1999 | Lawler |
| 6,178,461 B1 | 1/2001 | Chan et al. |
| 6,182,133 B1 | 1/2001 | Horvitz |
| 6,339,787 B1 | 1/2002 | Yohe et al. |
| 6,701,316 B1 | 3/2004 | Li et al. |
| 6,757,283 B1 | 6/2004 | Yamanaka et al. |
| 6,865,655 B1 | 3/2005 | Andersen |
| 6,879,808 B1 | 4/2005 | Nations et al. |
| 7,023,818 B1 | 4/2006 | Elliott |
| 7,124,305 B2 | 10/2006 | Margolus et al. |
| 7,130,890 B1 | 10/2006 | Kumar et al. |
| 7,143,251 B1 | 11/2006 | Patterson |
| 7,340,510 B1 | 3/2008 | Liskov et al. |
| 7,359,956 B2 | 4/2008 | Kanai et al. |
| 7,376,150 B2 | 5/2008 | Vedantham et al. |
| 7,430,331 B2 | 9/2008 | Singh |
| 7,509,667 B1 | 3/2009 | Cook |
| 7,636,767 B2 | 12/2009 | Lev-Ran et al. |
| 7,680,897 B1 | 3/2010 | Carter et al. |
| 7,681,032 B2 | 3/2010 | Peled et al. |
| 7,716,367 B1 | 5/2010 | Leighton et al. |
| 7,778,438 B2 | 8/2010 | Malone |
| 7,814,149 B1 | 10/2010 | Stringham |
| 7,836,177 B2 | 11/2010 | Kasriel et al. |
| 7,917,531 B2 | 3/2011 | Sakurai et al. |
| 7,941,409 B2 | 5/2011 | Mimatsu |
| 7,953,881 B1 | 5/2011 | Vadlakonda et al. |
| 8,010,705 B1 | 8/2011 | Sebastian et al. |
| 8,041,677 B2 | 10/2011 | Sumner et al. |
| 8,055,616 B2 | 11/2011 | Johnston et al. |
| 8,082,228 B2 | 12/2011 | Mu |
| 8,151,004 B1 | 4/2012 | Ufimtsev et al. |
| 8,230,059 B1 | 7/2012 | Santos et al. |
| 8,230,461 B1 | 7/2012 | Ledermann et al. |
| 8,284,773 B1 | 10/2012 | Woleben et al. |
| 8,477,635 B2 | 7/2013 | Sebastian et al. |
| 8,489,672 B2 | 7/2013 | Sebastian et al. |
| 8,489,673 B2 | 7/2013 | Sebastian et al. |
| 8,639,744 B2 | 1/2014 | Sebastian |
| 8,671,223 B1 | 3/2014 | Sebastian et al. |
| 8,775,503 B2 | 7/2014 | Sebastian |
| 8,842,553 B2 | 9/2014 | Sebastian et al. |
| 8,897,302 B2 | 11/2014 | Sebastian |
| 9,137,568 B2 | 9/2015 | Sinha et al. |
| 9,172,748 B2 | 10/2015 | Sebastian |
| 9,363,308 B2 | 6/2016 | Sebastian et al. |
| 9,369,516 B2 | 6/2016 | Sebastian et al. |
| 9,407,355 B1 | 8/2016 | Lerner |
| 9,762,635 B2 | 9/2017 | Sebastian et al. |
| 2001/0016836 A1 | 8/2001 | Boccon-Gibod et al. |
| 2001/0043600 A1 | 11/2001 | Chatterjee et al. |
| 2002/0006116 A1 | 1/2002 | Burkhart |
| 2002/0026478 A1 | 2/2002 | Rodgers et al. |
| 2002/0129168 A1 | 9/2002 | Kanai et al. |
| 2002/0154887 A1 | 10/2002 | Lu |
| 2002/0188735 A1 | 12/2002 | Needham et al. |
| 2002/0194473 A1 | 12/2002 | Pope et al. |
| 2003/0018581 A1 | 1/2003 | Bratton et al. |
| 2003/0018878 A1 | 1/2003 | Dorward et al. |
| 2003/0050966 A1 | 3/2003 | Dutta et al. |
| 2003/0126275 A1 | 7/2003 | Mungavan et al. |
| 2004/0081199 A1 | 4/2004 | Lopez et al. |
| 2004/0205071 A1 | 10/2004 | Uesugi et al. |
| 2005/0010870 A1 | 1/2005 | Gu et al. |
| 2005/0033747 A1 | 2/2005 | Wittkotter |
| 2005/0131903 A1 | 6/2005 | Margolus et al. |
| 2005/0249231 A1 | 11/2005 | Khan |
| 2005/0289629 A1 | 12/2005 | Nadarajah |
| 2006/0064383 A1 | 3/2006 | Marking |
| 2006/0126667 A1* | 6/2006 | Smith ................ H04N 7/17318 370/486 |
| 2006/0161625 A1 | 7/2006 | Norp et al. |
| 2006/0167969 A1 | 7/2006 | Andreev et al. |
| 2006/0184960 A1 | 8/2006 | Horton et al. |
| 2006/0253444 A1 | 11/2006 | O'Toole et al. |
| 2006/0277257 A1 | 12/2006 | Kromann et al. |
| 2006/0288072 A1 | 12/2006 | Knapp et al. |
| 2007/0033408 A1 | 2/2007 | Morten |
| 2007/0101074 A1 | 5/2007 | Patterson |
| 2007/0111713 A1 | 5/2007 | Silverbrook et al. |
| 2007/0116151 A1 | 5/2007 | Thesling |
| 2007/0133554 A1 | 6/2007 | Ederer et al. |
| 2007/0143484 A1 | 6/2007 | Drouet et al. |
| 2007/0174246 A1 | 7/2007 | Sigurdsson et al. |
| 2007/0220303 A1 | 9/2007 | Kimura et al. |
| 2007/0256021 A1 | 11/2007 | Prager et al. |
| 2007/0288518 A1 | 12/2007 | Crigler et al. |
| 2008/0005086 A1 | 1/2008 | Moore |
| 2008/0016201 A1 | 1/2008 | Thompson |
| 2008/0022135 A1 | 1/2008 | Gaya |
| 2008/0066182 A1 | 3/2008 | Hickmott et al. |
| 2008/0144713 A1 | 6/2008 | Kimmich et al. |
| 2008/0155614 A1 | 6/2008 | Cooper et al. |
| 2008/0175239 A1 | 7/2008 | Sistanizadeh et al. |
| 2008/0192820 A1 | 8/2008 | Brooks et al. |
| 2008/0205396 A1 | 8/2008 | Dakshinamoorthy et al. |
| 2008/0235391 A1 | 9/2008 | Painter et al. |
| 2008/0235739 A1 | 9/2008 | Coebergh Van Den Braak |
| 2008/0256138 A1 | 10/2008 | Sim-Tang |
| 2008/0263130 A1 | 10/2008 | Michalowitz et al. |
| 2008/0320151 A1 | 12/2008 | McCanne et al. |
| 2009/0037393 A1 | 2/2009 | Fredricksen et al. |
| 2009/0049469 A1 | 2/2009 | Small et al. |
| 2009/0055471 A1 | 2/2009 | Kozat et al. |
| 2009/0055862 A1 | 2/2009 | Knoller et al. |
| 2009/0060086 A1 | 3/2009 | Kimmich et al. |
| 2009/0158318 A1 | 6/2009 | Levy |
| 2009/0168795 A1 | 7/2009 | Segel |
| 2009/0187673 A1 | 7/2009 | Ramjee et al. |
| 2009/0196296 A1 | 8/2009 | Vachuska |
| 2009/0234809 A1 | 9/2009 | Bluger et al. |
| 2009/0265516 A1 | 10/2009 | Prabhu et al. |
| 2009/0271528 A1 | 10/2009 | Gurevich et al. |
| 2009/0313329 A1 | 12/2009 | Agrawal et al. |
| 2009/0327505 A1 | 12/2009 | Rao et al. |
| 2010/0058430 A1 | 3/2010 | Jones et al. |
| 2010/0083322 A1 | 4/2010 | Rouse |
| 2010/0097932 A1 | 4/2010 | Wu |
| 2010/0177642 A1 | 7/2010 | Sebastian et al. |

(56) References Cited

U.S. PATENT DOCUMENTS

| | | |
|---|---|---|
| 2010/0179984 A1 | 7/2010 | Sebastian et al. |
| 2010/0179986 A1 | 7/2010 | Sebastian et al. |
| 2010/0179987 A1 | 7/2010 | Sebastian |
| 2010/0180046 A1* | 7/2010 | Sebastian ............ H04L 12/1859 709/234 |
| 2010/0180082 A1 | 7/2010 | Sebastian |
| 2010/0185730 A1 | 7/2010 | Sebastian |
| 2010/0281105 A1 | 11/2010 | Sebastian |
| 2011/0140840 A1 | 6/2011 | Hardacker et al. |
| 2011/0274006 A1 | 11/2011 | Mills et al. |
| 2012/0039231 A1 | 2/2012 | Suri et al. |
| 2012/0060121 A1 | 3/2012 | Goldberg et al. |
| 2012/0072933 A1 | 3/2012 | Moore |
| 2012/0094593 A1* | 4/2012 | Burr ..................... H04B 7/2041 455/12.1 |
| 2012/0173746 A1* | 7/2012 | Salinger .............. H04L 41/5019 709/230 |
| 2012/0184309 A1 | 7/2012 | Cohen |
| 2013/0080701 A1* | 3/2013 | Markovitz ......... H04B 7/18517 711/115 |
| 2013/0185387 A1 | 7/2013 | Gero |
| 2013/0282796 A1 | 10/2013 | Sebastian et al. |
| 2013/0282863 A1 | 10/2013 | Sebastian et al. |
| 2014/0029612 A1 | 1/2014 | Sebastian et al. |
| 2014/0040353 A1 | 2/2014 | Sebastian et al. |
| 2014/0193027 A1 | 7/2014 | Scherf et al. |
| 2015/0026241 A1 | 1/2015 | Sebastian |
| 2015/0032848 A1 | 1/2015 | Sebastian et al. |
| 2015/0036686 A1 | 2/2015 | Sebastian |
| 2015/0127715 A1 | 5/2015 | Dankberg |

FOREIGN PATENT DOCUMENTS

| | | |
|---|---|---|
| WO | WO-2001/084777 A2 | 11/2001 |
| WO | WO-2002/041527 A1 | 5/2002 |
| WO | WO-2004/036362 A2 | 4/2004 |
| WO | WO-2007/051079 A2 | 5/2007 |
| WO | WO-2010/083214 A2 | 7/2010 |
| WO | WO-2010/083248 A2 | 7/2010 |

OTHER PUBLICATIONS

Adamson et al., "NACK-Oriented Reliable Multicast (NORM) Transport Protocol", RFC 5740, Nov. 2009, 95 pgs.

Adamson et al., "Negative-acknowledgment (NACK)-Oriented Reliable Multicast (NORM) Protocol", RFC 3940, Nov. 2004, 81 pgs.

Fonseca et al., BitTorrent Protocol—BTP/1.0, Version 1.0, Revision 1.33, Apr. 2005, DIKU, http://jonas.nitro.dk/bittorrent/bittorrent-rfc.html, 15 pgs.

Frantzeskou et al., "Effective Identification of Source Code Authors Using Byte-Level Information," ICSE '06, May 20-28, 2006, Shanghai, China, ACM 1-59593-085-X/06/0005, XP040040085, pp. 893-896.

Handley et al., "The Reliable Multicast Design Space for Bulk Data Transfer", RFC 2887, Aug. 2000, 22 pgs.

Paul et al., "Distributed caching with centralized control," Computer Communications, vol. 24, Issue 2, Feb. 1, 2001, pp. 256-268.

Selvakumar et al., "Implementation and comparison of distributed caching schemes," Computer Communications, vol. 24, Issues 7-8, Apr. 1, 2001, pp. 677-684.

International Search Report and Written Opinion mailed in International Application No. PCT/US2010/020897 dated Aug. 16, 2010, 15 pgs.

International Preliminary Report on Patentability mailed in International Application No. PCT/US2010/020897 dated Jul. 19, 2011, 10 pgs.

International Search Report and Written Opinion mailed in International Application No. PCT/US2010/020940 dated Sep. 22, 2010, 15 pgs.

International Preliminary Report on Patentability mailed in International Application No. PCT/US2010/020940 dated Jul. 19, 2011, 10 pgs.

International Search Report and Written Opinion mailed in International Application No. PCT/US2013/043038 dated Jan. 21, 2014, 10 pgs.

International Preliminary Report on Patentability mailed in International Application No. PCT/US2013/043038 dated Dec. 16, 2014, 7 pgs.

Non-Final Office Action mailed in U.S. Appl. No. 14/070,977 dated Oct. 8, 2015, 24 pgs.

Final Office Action mailed in U.S. Appl. No. 14/070,977 dated Feb. 23, 2016, 28 pgs.

Advisory Action mailed in U.S. Appl. No. 14/070,977 dated May 5, 2016, 3 pgs.

Non-Final Office Action mailed in U.S. Appl. No. 14/046,781 dated Nov. 16, 2015, 29 pgs.

Non-Final Office Action mailed in U.S. Appl. No. 14/517,337 dated Dec. 31, 2015, 20 pgs.

Final Office Action mailed in U.S. Appl. No. 14/517,337 dated May 24, 2016, 22 pgs.

Extended European Search Report mailed in European Patent Application No. 12171996.7 dated Feb. 2, 2015, 8 pgs.

Non-Final Office Action mailed in U.S. Appl. No. 13/919,861 dated Oct. 6, 2016, 18 pgs.

Non-Final Office Action mailed in U.S. Appl. No. 13/919,888 dated Oct. 7, 2016, 20 pgs.

Final Office Action mailed in U.S. Appl. No. 14/046,781 dated Jun. 20, 2016, 26 pgs.

Non-Final Office Action mailed in U.S. Appl. No. 14/070,977 dated Jul. 18, 2016, 28 pgs.

Advisory Action mailed in U.S. Appl. No. 14/517,337 dated Aug. 23, 2016, 4 pgs.

Non-Final Office Action mailed in U.S. Appl. No. 14/517,337 dated Jan. 26, 2017, 25 pgs.

Final Office Action mailed in U.S. Appl. No. 14/070,977 dated Jan. 27, 2017, 22 pgs.

Final Office Action mailed in U.S. Appl. No. 13/919,888 dated May 5, 2017, 24 pgs.

Notice of Allowance mailed in U.S. Appl. No. 13/919,861 dated May 15, 2017, 19 pgs.

Final Office Action mailed in U.S. Appl. No. 14/517,337 dated Jul. 11, 2017, 31 pgs.

Advisory Action mailed in U.S. Appl. No. 13/919,888 dated Jul. 28, 2017, 4 pgs.

Notice of Allowance mailed in U.S. Appl. No. 14/517,337 dated Nov. 24, 2017, 8 pgs.

Non-Final Office Action mailed in U.S. Appl. No. 14/046,781 dated Aug. 24, 2017, 24 pgs.

Non-Final Office Action mailed in U.S. Appl. No. 13/919,888 dated Aug. 28, 2017, 22 pgs.

U.S. Appl. No. 15/914,807, filed Mar. 7, 2018, 69 pgs.

Final Office Action mailed in U.S. Appl. No. 13/919,888 dated Mar. 8, 2018, 22 pgs.

Final Office Action mailed in U.S. Appl. No. 14/046,781 dated May 4, 2018, 23 pgs.

* cited by examiner

OPPORTUNISTIC DELIVERY OF CACHEABLE CONTENT IN A COMMUNICATIONS NETWORK

FIELD

Embodiments relate generally to communications systems, and, more particularly, to content delivery over satellite communications systems.

BACKGROUND

In some topologies of communications systems, groups of users share some or all of the system resources. For example, in some satellite communications systems, users share communications links for communicating with a service provider via a gateway. Communication services provided to the users over the shared links can be affected by a number of factors. One such factor is that link usage across the subscriber base can change in dynamic and sometimes unpredictable ways over time. Another such factor is that the effective bandwidth of the link can change due to changes in link conditions (e.g., rain fade, etc.). These and/or other factors can cause sub-optimal (i.e., less than full) utilization of the satellite link. Additionally, usage patterns, such as multiple transfers of the same content to users sharing the satellite link, can further impact optimal utilization of the link.

Some traditional techniques schedule a predetermined amount of content to be pre-pushed to subscribers over a limited, pre-defined block of off-peak time (e.g., in the middle of the night). These techniques are limited in a number of ways. For example, traditional techniques tend to leave appreciable amounts of bandwidth unused over time. Further, reliance by these techniques on anticipating possible future content requests can also waste valuable bandwidth resources by sending large amounts of data that are never consumed by some or all of the receiving users.

BRIEF SUMMARY

Among other things, systems and methods are described for using opportunistically delayed delivery of content to address sub-optimal bandwidth resource usage in network infrastructures that allow subscribers to share link resources. According to some embodiments, content is identified as delayable and assigned to a delaycast queue and/or service flow. For example, a server system of a satellite communications system identifies content that can be delayed to exploit future excess link capacity through multicasting and to exploit subscriber-side storage resources. Some implementations attempt to exploit any excess link resources at any time, while others exploit unused bandwidth only during certain times or when a certain threshold of resources is available. Various embodiments also provide content scoring and/or other prioritization techniques for optimizing exploitation of the delaycast queue.

According to one set of embodiments, a method is provided for delayed content delivery in a communications infrastructure that provides sharing of at least a communications link when communicating with at least some of a number of subscriber terminals. The method includes: receiving a number of content objects from a number of content sources at a gateway of a satellite infrastructure; determining, by the gateway, if the content object is a delayable object; assigning each content object determined to be a delayable object to a delaycast queue for delayed delivery over the satellite infrastructure; identifying next-scheduled data from an associated content object in the delaycast queue; determining dynamically that excess capacity is presently available on the communications link; and assigning the next-scheduled data to a service flow for communication over the communications link.

According to another set of embodiments, a gateway system is provided for delayed content delivery in a communications infrastructure that provides sharing of at least a communications link when communicating with at least some of a number of subscriber terminals. The gateway system includes a content processing subsystem and a communications processing subsystem. The content processing subsystem is operable to: receive a number of content objects from a number of content sources; determine if the content object is a delayable object; and assign each content object determined to be a delayable object to a delaycast queue. The communications processing subsystem is communicatively coupled with the content processing subsystem and is operable to: identify next-scheduled data from an associated content object in the delaycast queue; determine dynamically that excess capacity is presently available on the communications link; and assign the next-scheduled data to a service flow for communication over the communications link within the excess capacity.

According to another set of embodiments, a system is provided for delayed content delivery in a communications infrastructure that provides sharing of at least a communications link when communicating with at least some of a number of subscriber terminals. The system includes: means for receiving a number of content objects from a number of content sources at a gateway of a satellite infrastructure; means for determining if the content object is a delayable object; means for assigning each content object determined to be a delayable object to a delaycast queue for delayed delivery over the satellite infrastructure; means for identifying next-scheduled data from an associated content object in the delaycast queue; means for determining dynamically that excess capacity is presently available on the communications link; and means for assigning the next-scheduled data to a service flow for communication over the communications link.

According to another set of embodiments, a gateway system is provided for delayed content delivery in a communications infrastructure that provides sharing of at least a communications link when communicating with at least some of a number of subscriber terminals. The gateway system includes a content processing subsystem and a communications processing subsystem. The content processing subsystem is operable to maintain a queue of identifiers corresponding to delayable content objects. The communications processing subsystem is communicatively coupled with the content processing subsystem and is operable to: determine that excess capacity is presently available on the communications link; identify a next content object to request according to the queue of identifiers; request the next content object from an associated content source in response to determining that the excess capacity is presently available; receive the next content object at the gateway from the associated content source in response to the request; assign the next content object after it is received at the gateway to a delaycast queue local to the gateway for delayed delivery over the communications link; and assign data from the delaycast queue to a service flow for communication over the presently available excess capacity on the communications link.

According to another set of embodiments, a method is provided for delayed content delivery in a communications infrastructure that provides sharing of at least a communications link when communicating with at least some of a number of subscriber terminals. The method includes: maintaining a queue of identifiers corresponding to delayable content objects, the queue of identifiers being ordered according to priority; determining dynamically that excess capacity is presently available on the communications link; identifying a next-scheduled content object from the queue of identifiers, the content object being associated with a content source; requesting the next-scheduled content object from the content source in response to determining that the excess capacity is presently available; receiving the next-scheduled content object at the gateway from the content source in response to the requesting step; assigning the next-scheduled content object after it is received at the gateway to a delaycast queue local to the gateway for delayed delivery over the communications link; and assigning data from the delaycast queue to a service flow for communication over the presently available excess capacity on the communications link.

According to another set of embodiments, a system is provided for delayed content delivery in a communications infrastructure that provides sharing of at least a communications link when communicating with at least some of a number of subscriber terminals. The system includes: means for maintaining a queue of identifiers corresponding to delayable content objects, the queue of identifiers being ordered according to priority; means for determining dynamically that excess capacity is presently available on the communications link; means for identifying a next-scheduled content object from the queue of identifiers, the content object being associated with a content source; means for requesting the next-scheduled content object from the content source in response to determining that the excess capacity is presently available; means for receiving the next-scheduled content object at the gateway from the content source in response to the requesting step; means for assigning the next-scheduled content object after it is received at the gateway to a delaycast queue local to the gateway for delayed delivery over the communications link; and means for assigning data from the delaycast queue to a service flow for communication over the presently available excess capacity on the communications link.

BRIEF DESCRIPTION OF THE DRAWINGS

The present disclosure is described in conjunction with the appended figures.

Figure 1:
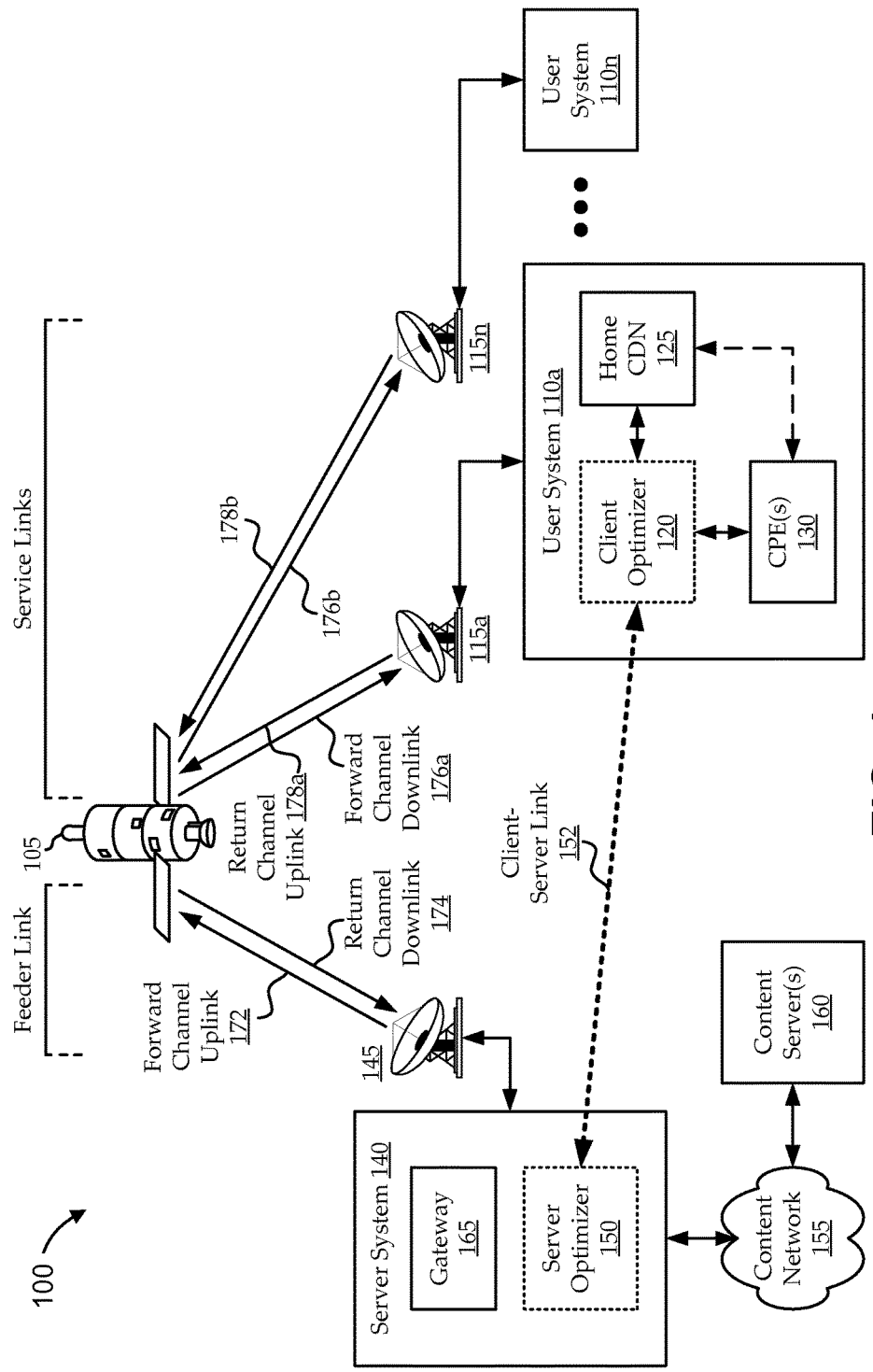
FIG. 1 shows a block diagram of an embodiment of a satellite communications system having a server system in communication with multiple user systems via a satellite, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In a communications network, a service provider can facilitate communications between content producers and content consumers over a communications infrastructure. Each communications transaction uses infrastructure resources, like bandwidth. As the numbers and/or sizes of those transactions increase, resource limitations can become an issue for the service provider. In certain topologies of communications systems, like satellite communications systems, groups of subscribers can share some or all of the infrastructure resources. Accordingly, shared bandwidth resources can be exploited by subsets of subscribers by employing techniques, such as multicasting.

Some traditional techniques schedule a predetermined amount of content to be pre-pushed to subscribers (in anticipation of potential requests by those subscribers) during a block of time when at least a minimum amount of bandwidth is very likely to be available. For example, in the middle of the night, subscriber usage tends to fall dramatically for a few hours, and anticipatory content delivery can be scheduled for that time. However, these techniques still tend to leave appreciable amounts of bandwidth unused over time. Further, reliance by these techniques on anticipating possible future content requests can also waste valuable bandwidth resources by sending large amounts of data that are never consumed by some or all of the receiving users.

Embodiments provide novel techniques for opportunistically addressing sub-optimal bandwidth resource usage in network infrastructures that allow subscribers to share infrastructure resources. As used herein, the "opportunistic" techniques broadly refer to techniques for dynamically optimizing infrastructure resources based on present usage of those resources. Embodiments implement opportunistic time shifting and/or opportunistic delay shifting techniques. For example, some novel techniques are described in which present resource usage influences exploitation of un-provisioned bandwidth resources through delayed content delivery, while other novel techniques are described in which present resource usage influences exploitation of shared bandwidth resources and client-side caching through multicasting. These and other techniques are described more fully herein.

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention. Further, terms such as "optimize" are intended to connote a relative or desired outcome, rather than an absolute outcome, and should not be considered as limiting potential embodiments. For example, embodiments described with reference to optimization are intended to include even variations deemed to be suboptimal.

Turning first to FIG. 1, a block diagram is shown of an embodiment of a satellite communications system 100 having a server system 140 in communication with multiple user systems 110 via a satellite 105, according to various embodiments. The server system 140 can include any suitable server components, configured to provide various server-side functions, including server-side infrastructure functions and various content and media optimization functions. For the sake of simplicity, FIG. 1 is illustrated as having a single gateway 165 in communication with one or more content servers 160 via a content network 155. However, each of the gateway 165, content network 155, and other components, nodes, or networks is intended to be illustrative of functionality of one or more components. For example, the gateway 165 can be implemented as one or more gateways 165 in communication with one or more base stations, hubs, ground stations, backhaul networks, etc. Further, each node and/or network can be in communication over various types of communications links, such as leased high-bandwidth lines (e.g., raw Ethernet), a virtual private large-area network service (VPLS), an Internet protocol virtual private network (IP VPN), or other types of public or private, wired or wireless network. Accordingly, references to a "gateway" are intended generally to include any components, nodes, or networks used to implement functionality of a satellite communications service provider; and references to a "content network" are intended generally to include any public or private, wired or wireless (e.g., short-range or long range, cellular, satellite, etc.) networks components, nodes, or networks used to deliver content to the gateway 165 as desired.

In some embodiments, the gateway 165 is configured to implement relatively simple routing functions. For example, the gateway 165 can receive traffic from the content network 155, determine which of a number of spot beams and/or carriers should receive the traffic, and route the traffic accordingly. In other embodiments, the gateway 165 performs relatively complex functions, including, for example, network security, accounting, content acceleration, trend analysis, signal processing and/or encoding, etc. In still other embodiments, multiple gateways 165 share some or all of the desired network functionality. For example, it can be desirable to perform certain functions in one location, perform other functions in a distributed manner, and perform still other functions in a redundant manner. As illustrated, embodiments of the gateway 165 include, are in communication with, and/or implement functionality of a server optimizer 150, which will be described more fully below.

As traffic traverses the satellite communications system 100 in multiple directions, the gateway 165 can be configured to implement multi-directional communications functionality. For example, the gateway 165 can be configured to receive data and information directed to one or more user systems 110, and format the data and information for delivery to the respective destination device via the satellite 105; or receive signals from the satellite 105 (e.g., from one or more user systems 110) directed to a destination in the content network 155, and process the received signals for transmission through the content network 155. The content network 155 can be any type of content network 155 and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of content network 155 supporting data communication between devices described herein, in different embodiments. The content network 155 can also include both wired and wireless connections, including optical links.

As used herein, the terms "content servers" and "content sources" are used interchangeably and are intended broadly to include sources of content in which the users can be interested. For example, a content server 160 can provide website content, television content, movie or audio content, file sharing, multimedia serving, and/or any other useful content. It is worth noting that, in some embodiments, the content servers 160 are in direct communication with the server optimizer 150 (e.g., not through the content network 155). For example, the server optimizer 150 can be located in a gateway that includes a content or application server. As such, discussions of embodiments herein with respect to communications with content servers 160 over the content network 155 are intended only to be illustrative, and should not be construed as limiting.

Various types of functionality are described herein relating to communications between the server system 140 (e.g., the gateway 165) and one or more user systems 110. Server-side communications will also be referred to as communications relating to the server, service provider, or the like. User-system-side communications will also be referred to as communications relating to the user, client, subscriber, consumer, customer, or the like. For example, many functions described herein are only available to subscribers of certain services from a service provider. The service provider can own and/or control some or all of the components that facilitate the functionality, such as the gateway 165, the server-side antenna 145, the satellite 105, etc. In some embodiments, the service provider also owns some or all of the subscriber-side antennas 115 and other user system 110 components (e.g., the subscribers can lease hardware from the service provider, including antennas, modems, set-top boxes, etc.). In other embodiments, the service provider further owns some or all of the content network 155, content servers 160, etc.

As will be described more fully below, embodiments of the user systems 110 are configured to perform various types of functionality using a client optimizer 120. For example, the client optimizer 120 can help manage content requests and content delivery. In some implementations, the client optimizer 120 is in communication with the server optimizer 150 of the gateway 165 in such a way as to effectuate advanced optimization functions. For the sake of simplicity, certain client-server types of functionality can be referred to as involving communications over a virtual (or logical) client-server link 152, though this "link" may, in fact, include a number of physical links from one or more communications infrastructures. For example, the client optimizer 120 and the server optimizer 150 can act as a proxy client and a proxy server, respectively, in communication over a proxy tunnel (i.e., the client-server link 152) that facilitates acceleration, optimization, and other functionality.

In some embodiments, the user systems 110 include one or more customer premises devices (e.g., set-top boxes, televisions, home network devices, etc.), referred to as "customer premises equipment" or "CPE" 130. Embodiments are also configured to implement a home content distribution network (CDN) 125. The home CDN 125 can include any useful types of storage and/or networking components. For example, embodiments of the home CDN 125 can include a single storage device (e.g., a server or disk drive), distributed local storage (e.g., a RAID array, set of servers, etc.), networked storage (e.g., using a local area network, a storage area network, "cloud" storage, or the like), etc. Various embodiments of the client optimizer 120 are configured to manage (e.g., direct, monitor, etc.) functions of the CPE(s) 130, the home CDN 125, communications among those components, communications between those components and other nodes of the satellite communications system 100, etc.

For the sake of illustration, optimization applications are configured to run at the server optimizer 150 and the client optimizer 120. These applications can work together to optimize bandwidth resources through novel techniques, such as "delaycasting" and opportunistic caching. One or both applications can identify particular content as "delayable" and assign the content to a delaycast queue, which can be implemented as part of the gateway 165. Over time, the server optimizer 150 identifies presently available bandwidth (i.e., not presently being used by user systems 110) and multicasts content from the delaycast queue over that available bandwidth. The delaycast content can then be opportunistically cached at the users' home CDNs 125 for potential future consumption.

In one embodiment, the satellite communications system 100 includes a number of gateways 165 distributed over a large geographic region. Each gateway 165 is in communication with the content network 155 via a high-speed connection (e.g., a dedicated high-bandwidth fiber link). Each gateway 165 is also in communication with, and handles communications for, up to twenty base stations (e.g., twenty feeder links). Each of the twenty base stations is configured to service up to four user links by communicating content for those user links to the satellite 105 using an antenna.

For the sake of simplicity, the multiple potential feeder links, antennas, base station communications, etc. are illustrated as a single communication via a single server-side antenna 145. The server-side antenna 145 can implement bi-directional communications with the gateway 165 and with the satellite 105. As used herein, communications from the gateway 165 to the satellite 105 via the server-side antenna 145 are referred to as the forward channel uplink 172, and communications to the gateway 165 from the satellite 105 via the server-side antenna 145 are referred to as the return channel downlink 174.

On the subscriber side of the satellite communications system 100, the satellite 105 is in communication with multiple user systems 110 via respective subscriber-side antennas 115. The subscriber-side antennas 115 and related hardware can also be referred to as a "user terminal," a "subscriber terminal," or the like. Information sent from the gateway 165 to the satellite 105 via the forward channel uplink 172 can continue on the forward channel to one or more user systems 110 via a link referred to herein as the forward channel downlink 176. Information can also be sent from the each user system 110 to the satellite 105 via its respective subscriber-side antenna 115 over what is referred to herein as the return channel uplink 178. That information can continue on the return channel, ultimately being communicated from the satellite 105 to the gateway 165 via the server-side antenna 145 over the return channel downlink 174.

In various embodiments, one or more of the satellite links are capable of communicating using one or more communication schemes. In various embodiments, the communication schemes can be the same or different for different links. The communication schemes can include different types of coding and modulation combinations. For example, various satellite links can communicate using physical layer transmission modulation and coding techniques using adaptive coding and modulation schemes, etc. The communication schemes can also use one or more different types of multiplexing schemes, including Multi-Frequency Time-Division Multiple Access ("MF-TDMA"), Time-Division Multiple Access ("TDMA"), Frequency Division Multiple Access ("FDMA"), Orthogonal Frequency Division Multiple Access ("OFDMA"), Code Division Multiple Access ("CDMA"), or other suitable schemes.

Embodiments of the satellite 105 can be implemented as a geostationary satellite, a low earth orbit ("LEO") satellite, or aerial payloads not in orbit and held aloft by planes, blimps, weather balloons, etc. Other embodiments could have a number of satellites 105 instead of just one. In one embodiment, the satellite 105 is configured as a "bent pipe" satellite, wherein the satellite 105 can frequency-convert and amplify the received carrier signals before retransmitting these signals to their destination, but otherwise perform little or no other processing on the contents of the signals. There could be a single carrier signal for each service spot beam or multiple carriers in different embodiments. Similarly, single or multiple carrier signals could be used for feeder spot beams. A variety of physical layer transmission modulation and coding techniques can be used by the satellite 105 in accordance with certain embodiments, including those defined with the DVB-S2 standard. For other embodiments, a number of configurations are possible (e.g., using LEO satellites, mesh networks, star networks, etc.).

Figure 2:
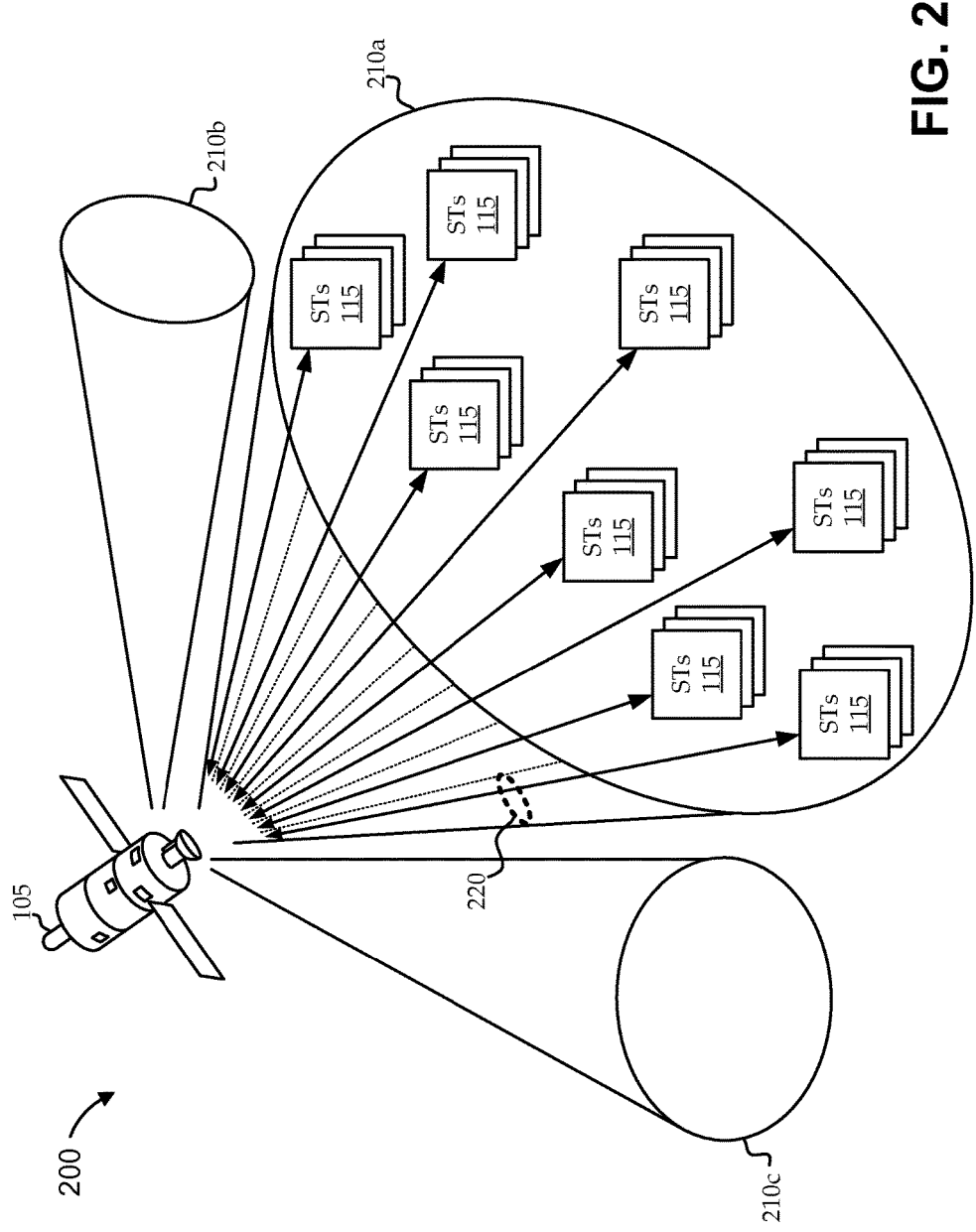
FIG. 2 shows a simplified, illustrative satellite communications system with a satellite communicating with a number of subscribers over multiple spot beams, according to various embodiments.

For example, turning to FIG. 2, a simplified, illustrative satellite communications system 200 is shown with a satellite 105 communicating with a number of subscribers over multiple spot beams 210, according to various embodiments. The satellite 105 is illustrated operating in a multi-beam mode, transmitting a number of spot beams 210, which can each be directed at a different region of the earth. Each spot beam 210 can be associated with a user link (e.g., a feeder link or a portion of a feeder link), and used to communicate between the satellite 105 and a large group (e.g., thousands) of user systems 110 via their respective subscriber-side antennas 115 (illustrated as subscriber terminals, or "STs").

In a given spot beam 135, some or all of the users serviced by the spot beam 210 via respective STs 115 can be capable of receiving all the content traversing the spot beam 210 by virtue of the fact that the satellite communications system 200 effectively broadcasts data between the satellite 105 and various antennas. In some embodiments, each spot beam 210 is configured to send data over a number of carriers 220 (e.g., defined by time, frequency, or code multiplexing schemes or combinations thereof). Each ST 115 can be configured to "tune in" to one or more carriers 220 at a time via its respective antenna. Some functionality is facilitated by selectively retuning the STs 115 to particular carriers 220 at particular times to receive intended data.

Other techniques can additionally or alternatively be used to provide data only to a subset of the STs 115 in a particular spot beam 210. Some such techniques include tagging content (e.g., using packet header information according to a transmission protocol) with certain destination identifiers (e.g., an IP address), using different modcode points that can be reliably received only by certain STs 115, sending control information to STs 115 to direct the STs 115 to ignore or accept certain communications, etc. For example, multicast and unicast service flows can be established, so that particular STs 115 can effectively subscribe only to subsets of the data traversing the links. Each ST 115 can then be adapted to handle the received data accordingly. For example, content destined for a particular ST 115 can be passed on to its respective CPE (not shown), while content not destined for the ST 115 can be ignored. In some cases, the ST 115 stores information not destined for the associated user system 110 to facilitate various functions, some of which are described in more detail below.

Figure 4:
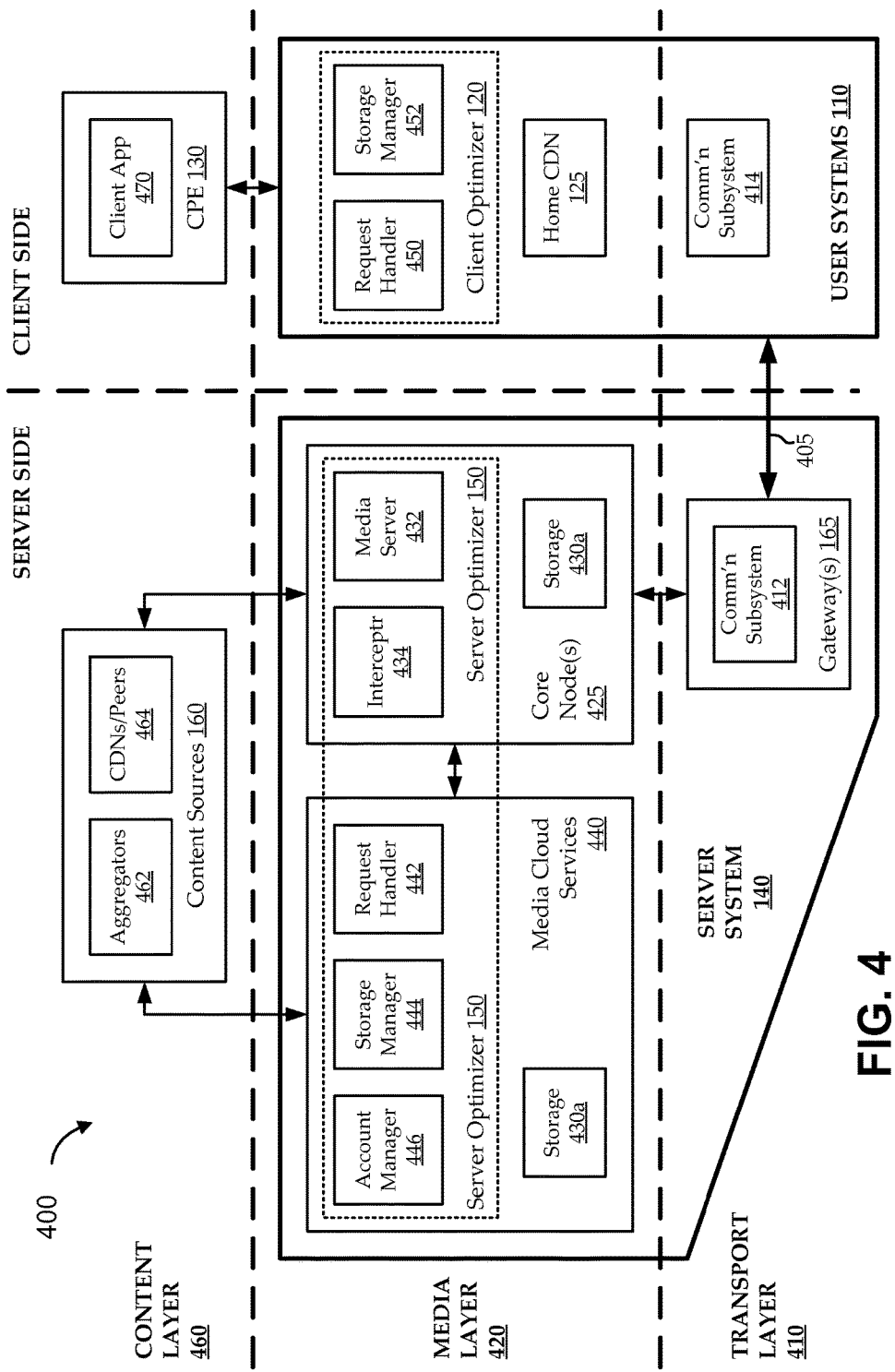
FIG. 4 shows a simplified block diagram of an illustrative communications architecture in which a server system is in communication with content sources and user systems, according to various embodiments.
Figure 5:
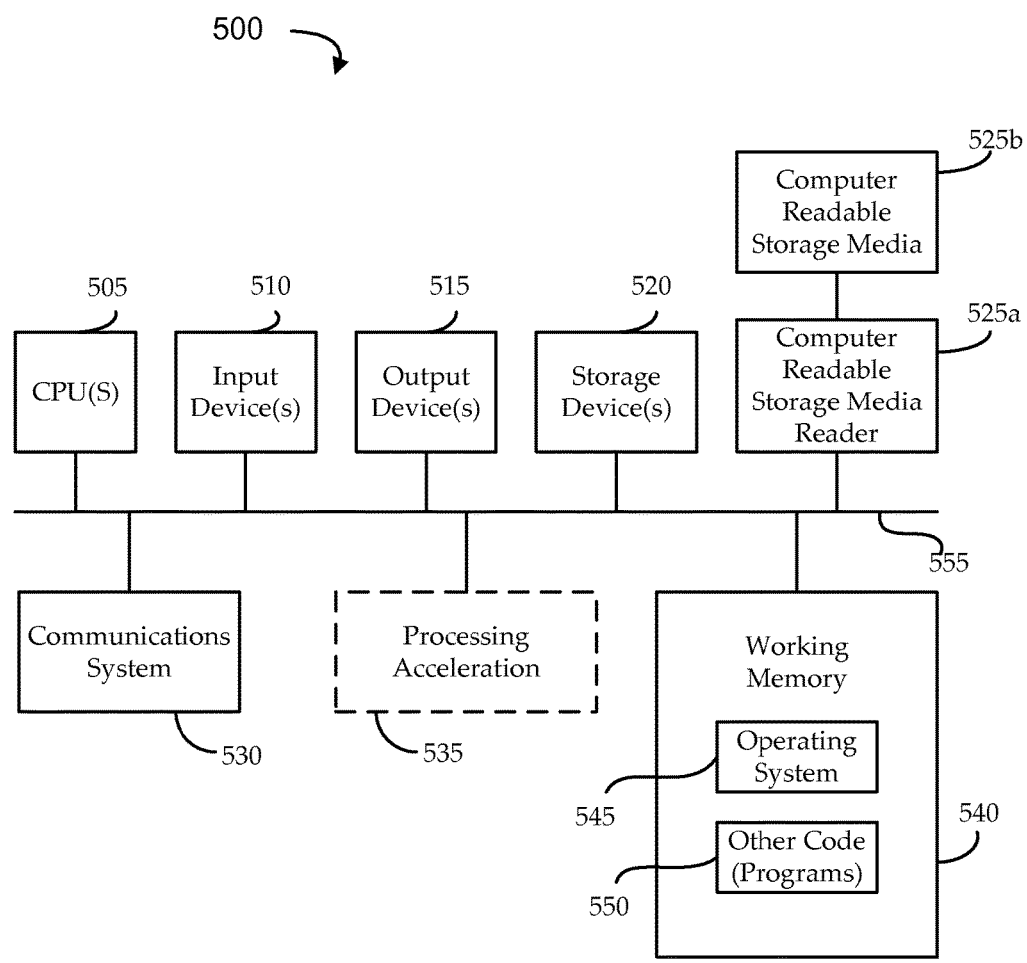
FIG. 5 shows an illustrative computational system for implementing functionality of a server system or a user system, according to various embodiments.

As described above, some content management functions are facilitated by server optimizer(s) 130 and/or client optimizer(s) 120. For example, in topologies, like the satellite communications systems 100 and 200 shown in FIGS. 1 and 2, respectively, vast amounts of traffic can traverse various portions of the satellite communications system 100 at any given time. At least some of the traffic traversing the network can be intercepted and/or otherwise monitored or affected by server optimizers 130 and/or client optimizers 120 for further processing and for additional functionality, such as for acceleration and resource optimization. For example, client-server techniques can be used to facilitate delaycasting techniques described herein. Accordingly, much of the functionality of various embodiments can be more clearly described as a client-server environment without the content of the underlying satellite communications systems infrastructure. To this end, FIGS. 3-5 illustrate illustrative client-server environments, components, and related functions.

Figure 3:
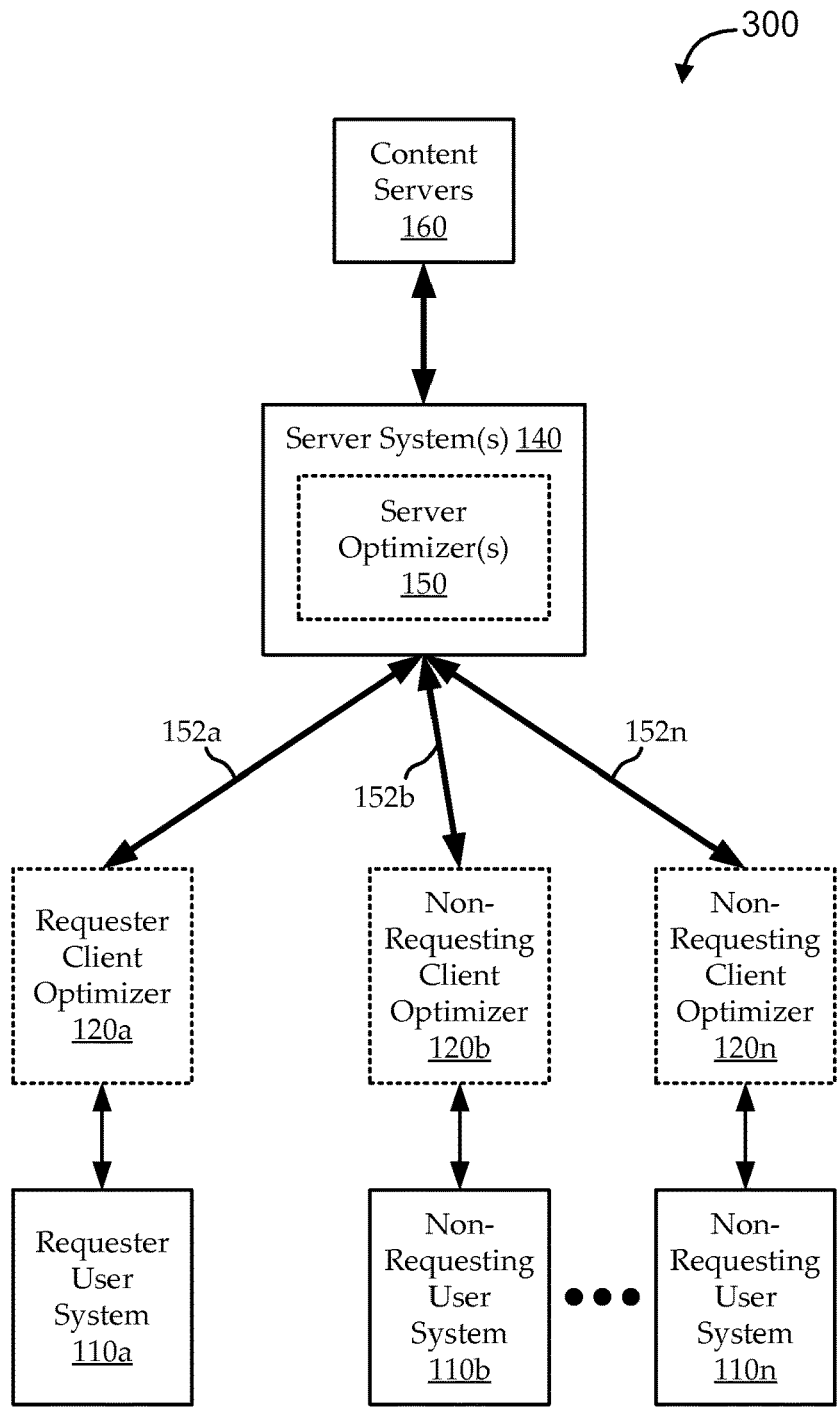
FIG. 3 shows a simplified block diagram of one embodiment of a client-server communications system for use with various embodiments.

Turning first to FIG. 3, a simplified block diagram is shown of one embodiment of a client-server communications system 300 for use with various embodiments. As in the satellite communications system 100 of FIG. 1, the communications system 300 facilitates communications between one or more server systems 140 having respective one or more server optimizers 150 and multiple user systems 110 having respective client optimizers 120. The server system(s) 140 are in communication with one or more content servers 160 (e.g., any type of content sources over any type of communications links). The communications links between the server systems 140 and the user systems 110 are simplified as client-server links 310. The client-server links 310 can include one or more of the same or different types of communications links, including, for example, forward and return channel links of a satellite communications system. While illustrated as separate from the respective user systems 110, the client optimizers 120 can be implemented as part of, in line with, in communication with, or in any other useful way associated with the respective user systems 110.

In some embodiments, the client optimizers 120 and the server optimizer(s) 150 can be configured to effectively provide transparent optimization (e.g., acceleration, resource optimization, etc.) functionality to user systems 110. For example, the user systems 110 can implement one or more user applications (e.g., a download manager, electronic program guide, etc.) as a web browser, browser plug-in or extension, media player, set-top box application, or any other client-side application that can benefit from the optimization functionality of the client optimizer 120 and server optimizer 150. As described more fully below, functionality of various embodiments exploits multicasting (e.g., opportunistic multicasting, delaycasting, etc.) over the client-server links 310, while preserving transparency to the user systems 110. In some implementations, end user devices (e.g., CPEs 130 of FIG. 1) communicate with components implementing the client optimizers 120 (e.g., satellite modems, etc.) over one or more local links that are implemented as a physical or logical unicast communications link; the client optimizer 120 components communicate with the server optimizer 150 components (e.g., the server systems 140) over client-server links 310 implemented as one or more physical and/or logical unicast and/or multicast communications links); and the server optimizer 150 components communicate with the content servers 160 over one or more content network links implemented as one or more physical and/or logical unicast communications links.

For the sake of illustration, a user requests to view a video stream through a web browser running on a local terminal (user system 110a). The request is issued as a unicast communication to a particular content server 160 (e.g., as a "GET" command), and the user application expects to receive a unicast communication in response to that request. In certain embodiments, the request is forwarded by the client optimizer 120a to the server optimizer 150 over the client-server link 125a as a unicast communication. The server optimizer 150 issues the request to the content server 160 as a proxy for the user system 110 and begins receiving the stream data in response to the request. The server optimizer 150 determines which data should be opportunistically multicast to multiple user systems 110, and communicates that data as multicast traffic over the client-server links 125 to any client optimizers 120 configured to receive the multicast traffic. For example, the data is communicated to the requester client optimizer 120a and to non-requesting client optimizers 120b-120n. Each client optimizer 120 can then determine whether to convert the traffic to a unicast stream, which it can then communicate over its local link to a destination. For example, the requester client optimizer 120a can communicate the unicast data stream to its requesting user application, and non-requesting client optimizers 120b-120n can determine whether to locally store the data (e.g., in respective home CDNs 125) or otherwise use the data. In this way, the user application 107 sees the response as the expected unicast communication of the stream content in response to its request, while allowing the server optimizer 150 to transparently perform optimization functionality (e.g., including opportunistic multicasting).

Various other functionality can be configured according to whether data is being sent opportunistically. For example, in cases where an explicit request is issued from a requester user system 110a, embodiments use various techniques to ensure reliable transport of the requested data at least to the requester user system 110a. The techniques can include selecting particular modulation and/or coding schemes, using particular transport protocols, using or avoiding certain types of compression, etc. For example, requested content can be communicated to the requester client optimizer 120a using a Pragmatic General Multicast ("PGM")

protocol, Negative-Acknowledgment ("NACK") Oriented Reliable Multicast ("NORM"), or "RFC 3940," protocol from the Internet Engineering Task Force ("IETF"), or any other reliable multicast protocol (e.g., which can be a standard or modified protocol, or included as part of another transport protocol). Similarly, it can be desirable to multicast content to non-requesting client optimizers 120b-120n using a protocol (e.g., PGM) that does not result in NACKs, or the like, so opportunistic receivers are not compelled under the protocol to provide feedback on missed packets, etc.

Embodiments of the optimizer (e.g., the server optimizer 160 and the client optimizer 120) can be implemented in a number of ways without departing from the scope of the invention. In some embodiments, the optimizer is implemented as a proxy, such that the server optimizer 150 is a proxy server and the client optimizer 120 is a proxy client. For example, a transparent intercept proxy can be used to intercept traffic in a way that is substantially transparent to users at the client-side of the proxy communication. In other embodiments, the optimizer is implemented as an in-line optimizer. For example, the client optimizer 120 is implemented within a user terminal and the server optimizer 150 is implemented within a provider terminal (e.g., a satellite base station or gateway, a cable head-end, a digital subscriber line access multiplexer (DSLAM), etc.). Other configurations are possible in other embodiments. For example, embodiments of the server optimizer 150 are implemented in the Internet cloud (e.g., on commercial network leased server space). Embodiments of the client optimizer 120 are implemented within a user's personal computer, within a user's modem, in a physically separate component at the customer premises, etc.

It is worth noting that references herein to "intercepting" data should be construed broadly to include any useful slowing, sampling, re-routing, and/or other techniques that allow processing of the data as required according to various embodiments. In some embodiments, traffic passes through the server optimizer 150, where it is "intercepted" by being buffered for analysis and processing. For example, the buffering can be used to slow and accumulate traffic for fingerprint generation and analysis, as described more fully below. Notably, certain embodiments described as using an optimizer component (e.g., the server optimizer 150) to intercept the traffic can actually be implemented by having a different component intercept the traffic, from which the optimizer component can receive the intercepted traffic for processing.

Embodiments of the user system 110 can include any component or components for providing a user with network interactivity. For example, the user system 110 can include any type of computational device, network interface device, communications device, or other device for communicating data to and from the user. Typically, the communications system 300 facilitates communications between multiple user systems 110 and a variety of content servers 160 over one or more client-server links 152 and content networks (not shown).

In some embodiments, when the user system 110 communicates with the content server 160, the server optimizer 150 intercepts the communications for one or more purposes. As described above, the server optimizer 150 can be part of a server system 140 that includes components for server-side communications (e.g., base stations, gateways, satellite modem termination systems (SMTSs), digital subscriber line access multiplexers (DSLAMs), etc.). In some alternative embodiments, server optimizer 150 functionality is implemented via "cloud" services or the like (e.g., not implemented physically or location-wise as part of any particular server system 140 component).

The server optimizer 150 can act as a transparent and/or intercepting proxy. For example, as described above, the client optimizer 120 is in communication with the server optimizer 150 over the client-server links 152, and the server optimizer 150 is in communication with the content server 160 over the content network link. The server optimizer 150 can act as a transparent man-in-the-middle to intercept upstream and/or downstream data as it passes between the client-server links 152 and the content network link. Some purposes of the interception can include filtering, caching, parsing, and/or otherwise processing the requests and responses. For example, when the user system 110 requests a web object from a content server 160, the server optimizer 150 can intercept and parse the request to implement various functions described herein.

In some embodiments, each user system 110 and server system 140 can include both client and server functionality (e.g., each can include both a client optimizer 120 and a server optimizer 150). Indeed, embodiments are implemented as a network device having both client optimizer 120 and server optimizer 150 functions, which can be deployed in various locations of a network. Further, references to a "requesting" or "non-requesting" user, user system, client optimizer, or the like are intended only to suggest a particular user's role for a particular transaction. The same user can be a non-requesting user in one transaction and the requesting user in a different transaction (e.g., at the same or different times). Even further, though only a single requester is shown for the sake of simplicity, a single transaction may involve multiple requesters, and/or multiple transactions may be processed concurrently such that the network includes many concurrent requesting and non-requesting users.

Accordingly, the illustrated communications system 300 can be considered, therefore, as either an actual network architecture or as a view of a network architecture from the perspective of one or more transactions or relationships. For example, the communications system 300 can be considered as illustrating a particular opportunistic multicasting relationship, in which the user system 110 is manifesting its client functionality through its client optimizer 120, and the server system 140 is manifesting its server functionality through its server optimizer 150; though each can play a different role in a different transaction or relationship. Further, the client-server links 152 can represent a link or set of links that are part of a larger network structure (e.g., a mesh network, peer-to-peer network, public Internet, etc.). For example, in the illustrative opportunistic multicasting relationship, a particular set of communications links in a network manifest client-server link 152 functionality (e.g., a persistent link) for the purpose of the relationship.

It is further worth noting that embodiments of the client-server links 152 and the content network links (e.g., between the server optimizer 150 and the content servers 160) can be implemented as various types of links having different and/or changing link characteristics, including, for example, differences in bandwidth, latency, cost per bit, etc. For example, the client-server links 125 between the server optimizers 150 and the client optimizers 120 can support one or more unicast service flows and one or more multicast service flows for supporting unicast and multicast traffic, respectively. Further, while certain embodiments are implemented in the context of a satellite communications system, where the client-server communication link 152 includes at least one satellite link, other topologies and link types are possible.

In one embodiment, the client-server link 152 includes a satellite communications link. As described above, satellites can effectively broadcast all their downstream traffic to all receivers that are tuned to a particular carrier, beam, etc. As such, unicasting or multicasting to one or more user systems 110 may, in fact, involve broadcasting the data over the "forward" satellite link and also broadcasting control data to direct receivers to either accept or ignore relevant portions of the broadcast data. The forward link includes the various links that bring downstream traffic to subscribers. For example, in the satellite communications system 100 of FIG. 1, the forward link is the forward channel uplink 172 and the forward channel downlinks 176. By tuning into a common carrier, multiple terminals can concurrently receive the same multicast traffic over their respective forward channel downlinks 176, thereby effectively sharing the forward link resources. Notably, while some system resources can be expended in setting up a multicast service flow and in related logistics, it "costs" the satellite communications system substantially the same bandwidth resources to send a packet to one user system 110 or to all user systems 110 (e.g., on a particular beam over a particular carrier).

Similarly, in another embodiment, the client-server link 152 includes a cable communications link. For example, a cable company can run a cable line to a neighborhood aggregator, from which individual coaxial lines communicate last mile traffic to individual households. Each individual coaxial cable can carry all the traffic for the entire neighborhood, even where some of that traffic is destined only for particular households. As in the satellite embodiment described above, since all the cable subscriber households in the same neighborhood effectively receive all the traffic, bandwidth resources can be shared by multicasting traffic, where appropriate. Of course, satellite and cable networks are only two illustrative embodiments of client-server links 152. Embodiments of the client-server communication link 152 can include other types of communications link that have limited bandwidth resources, where the bandwidth resources can be at least partially shared through multicasting.

Some embodiments are described herein with respect to downstream traffic and sharing of forward link bandwidth resources. Similar techniques can also be applied with respect to upstream traffic and/or sharing of return link resources. For example, certain media upload contexts, including peer-to-peer implementations, can exploit delaycasting and/or other functionality described herein in a manner that shares return link bandwidth resources.

FIG. 4 shows a simplified block diagram of an illustrative communications architecture 400 in which a server system 140 is in communication with content sources 160 and user systems 110, according to various embodiments. For the sake of clarity, the communications infrastructure 400 can be considered as a client-server architecture having a client side and a server side. The functionality can also be considered as operating at a transport layer 410, a media layer 420, and a content layer 460. These layers are not intended to match traditional layers of the Open Systems Interconnection (OSI) model or another standard protocol or the like. Rather, the layers are intended only to provide a general categorization of functionality for added clarity and should not be construed as limiting the scope of embodiments. Embodiments of the content layer 460 generally include components for providing content data. Embodiments of the media layer 420 generally include components for determining how to handle the content data with regard to providing media and related services to subscribers. Embodiments of the transport layer 410 generally include components for handling transport of data between the server system 140 and user systems 110 at least in support of the provided media and related services.

As illustrated, content can be communicated from one or more content sources 160 to one or more end-user devices (shown as CPE(s) 130). For example, a content request can be initiated by a CPE 130 and interpreted by an associated user system 110 for communication over the satellite communications environment 400. The user system 110 communicates the request to a server system 140 over a communications infrastructure (represented by link 405), for example, via its user-side antenna, a satellite, and a server-side antenna. The server system 140 can then attempt to fulfill the content request by requesting and receiving content from one or more content sources 160. In an alternate use case, content can be requested by the server system 140 (e.g., on behalf of or not on behalf of a user system 110), for example, for anticipatory pre-pushing of content. In another alternate use case, content can be pushed from one or more content sources 160 and/or server system 142 to one or more user systems 110.

Turning first to the server system 140 functionality, embodiments provide and handle media and related services with user systems 110 over an infrastructure illustrated by link 405. As discussed above, the link 405 can represent a satellite communications infrastructure or any other bandwidth-limited infrastructure in which forward link sharing can be exploited (e.g., through multicasting or the like). For the sake of simplicity, embodiments are described with reference to a satellite communications infrastructure. The server system 140 is illustrated as a distributed architecture, with functionality spread between gateways 165, core nodes 425, and media cloud services 440. In one illustrative embodiment, gateways 165 are geographically distributed, and each includes one or more base stations for handling communications over one or more spot beams and/or carriers. Each of multiple gateways feeds into one or more core nodes 425 of a backhaul network. Each core node 425 can then have high-bandwidth, high-reliability connections to the Internet, allowing effective implementation of certain services in the "cloud" (e.g., multiple distributed servers in communication over the Internet), illustrated as media cloud services 440.

It can be desirable to move certain types of functionality upstream. For example, size, servicing, and/or other features can limit the practical amount of processing available in downstream components, such as base stations and gateways 165. Accordingly, it can be more practical to move resource-intensive processing functions to core nodes 425 and/or to the media cloud services 440. Additionally, certain types of determinations can be made better when more information is available from across larger segments of the network. For example, determinations of content popularity can benefit from information gathered across multiple carriers on multiple spot beams. This type of information can be more readily available to components that are further upstream, such that performance of related functionality by upstream devices can be beneficial in certain cases.

For the above and/or other reasons, it can be desirable to implement functionality described herein in context of distributed architectures, like the one illustrated in FIG. 4. However, many alternative architectures are possible. For example, it can be desirable in certain contexts to push some or all of the functionality shown in the media layer 420 into components of a gateway 165 or other device. Alternatively, embodiments implement substantially all the functionality using media cloud services 440 in direct communication with a gateway 165 or other transport layer 410 component. Accordingly, functionality described herein should not be construed as relying on a particular architecture, except where indicated.

In any of these or other architectures, various types of data can be communicated upstream and/or downstream to facilitate functionality by different components, at different layers, etc. For example, the communications subsystem 412 can monitor actual present usage and conditions of the link 405 with respect to user systems 110, which it can communicate periodically to the upstream server optimizer 150. The server optimizer 150 can use this data to determine when and how to opportunistically multicast data. Data relating to these determinations can then be passed back to the communications subsystem 412 for use in determining appropriate transport protocols, link scheduling, and the like.

As illustrated, the server system 140 interfaces with link 405 via at least a gateway 165. Embodiments of the gateway 165 implement functionality of a communications subsystem 412. Embodiments of the communications subsystem 412 are configured to handle upstream and downstream communications with the service provider's communications system, for example, a satellite communications system via one or more server-side antennas. Implementations perform various functions, including, for example, encoding (e.g., adaptively), decoding, modulating (e.g., adaptively), demodulating, applying or processing error correction techniques, baseband encapsulating, frame creation, etc. (e.g., using various modcodes, lookup tables, etc.). Other functions can include upconverting, amplifying, filtering, tuning, tracking, etc. Embodiments of the communications subsystem 412 include modem termination functionality for receiving modem traffic over the satellite link from users, for example, configured as a satellite modem termination system ("SMTS").

Data or content requests received over the satellite communications system (e.g., from user systems 110) are passed from the communications subsystem 412 to one or more functions of the server optimizer 150 for processing. As illustrated, this can involve passing communications from a gateway 165 to its core node 425. Embodiments of the server optimizer 150 includes a media server 432, an intercepter 434, a request handler 442, a storage manager 444, and an account manager 446. In one embodiment, the media server 432 and intercepter 434 are implemented in the core node 425, while other functions of the server optimizer 150 are implemented in the media cloud services 440, though other module configurations and arrangements, data flows, etc. are possible according to other embodiments. In some embodiments, real-time types of data (e.g., User Datagram Protocol ("UDP") data traffic, like Internet-protocol television ("IPTV") programming) are routed only through certain functional blocks according to certain flows, while non-real-time types of data (e.g., Transmission Control Protocol ("TCP") data traffic, like web video) are routed through different functional blocks according to different flows. Various embodiments of the server optimizer 150 provide various types of application, WAN/LAN, and/or other acceleration functionality, including resource optimization and subscriber handling functions. In certain embodiments, the server optimizer 150 implements functionality of AcceleNet applications from ViaSat, Inc. This functionality can be used to exploit information, for example, from application layers of the protocol stack (e.g., layers 5-8 of the IP stack) through use of software or firmware operating in the user system 110 (e.g., in the user systems 110 and/or the CPE(s) 130).

In some embodiments, the server optimizer 150 is adapted to provide high payload compression. This allows faster transfer of the data and enhances the effective capacity of the network. The server optimizer 150 can also implement protocol-specific methods to reduce the number of round trips needed to complete a transaction, such as by prefetching objects embedded in HTTP pages. In other embodiments, functionality of the server optimizer 150 is closely integrated with the satellite link through other components, like communications subsystem 412, etc., to reduce download and/or upload bandwidth requirements and/or to more efficiently schedule to the satellite link. In some embodiments, the server optimizer 150 is implemented with multiple server optimizers 150. Each of the multiple server optimizers 150 can be configured to handle a portion of the traffic passing through the server system 140. It is worth noting that functionality of various embodiments described herein use data which, at times, can be processed in a distributed fashion. As such, one or more server management modules (not shown) or the like can be provided for processing (e.g., tracking, routing, partitioning, etc.) data across the multiple server optimizers 150. For example, when one server optimizer 150 receives a request from a user, the server management module can process that request in the context of other requests received at other server optimizers 150. In one embodiment, coordination between server optimizers 150 is implemented in support of singular storage of data. For example, it can be desirable to avoid caching the same byte sequence twice in two server optimizers 150 that are in communication with each other. In another embodiment, server optimizers 150 are configured to communicate to facilitate the identification of opportunities for performing optimization functions including those described herein.

Requests and/or other content received at the server system 140 can be intercepted by the intercepter 434 to determine appropriate handling. In some cases, traffic intercepted by the intercepter 434 is passed to and processed by the request handler 442. Embodiments of the request handler 442 make various types of determinations, such as what type of content is being requested or processed or what type of request is received. In some embodiments, the request handler 442 is configured to analyze traffic to parse requests, analyze packet headers, and the like. In other embodiments, the communications subsystem 412 performs some or all of those functions, so that the request handler module 442 receives data that is ready for processing.

Some embodiments of the request handler 442 categorize content in various ways and handle the content according to the classification. For example, "cacheable" content (or "public-type" content) is used herein to broadly include types of content that can be consumed by more than one subscriber, such as software updates, movies and television shows (for download or streaming), music (for download or streaming), e-magazines and e-books, blogs, podcasts, large-file and popular web content, large-file and popular advertisements, web videos, substantially real-time video streams (of sporting events, fashion shows, political addresses, etc.), etc. "Non-cacheable" content (or "private-type" content) is used herein to describe content intended for and likely to be used only by one subscriber, such as emails, short-form communications (e.g., instant messages, chats, SMS and MMS texts, tweets, and the like), voice over Internet Protocol (VoIP) communications, videochat and video conferencing sessions, personal shopping and banking transactions, two-party conferencing sessions, etc.

Embodiments identify content as "delayable" in various ways. As used herein, "delayable" content generally refers to some or all of a content object (e.g., a content file, data blocks or packets of a content file, a set of related content files, etc.) determined to be a valid candidate for opportunistically delayed delivery to one or more subscribers. Typically, the opportunistic delivery coincides with opportunistic storage of the delayable content at storage local to the receiving subscriber's user system 110 (e.g., the subscriber's home CDN 125). Generally, delayable content is a subset of cacheable content. For example, it may not provide benefit to opportunistically delay delivery of content that is likely to be used by only one user, particularly where the content is of a substantially real-time nature (e.g., real-time or near-real-time communications). Notably, determination that content is delayable does not necessitate delaying delivery of the content. Some implementations can delay delivery of delayable objects automatically, while other embodiments can delay delivery of delayable objects only when additional criteria are met.

Various techniques can be used to determine whether content is delayable. In some implementations, content objects that are cacheable and larger than some threshold size are determined to be delayable. For example, a large file representing video data for a new release movie can be both cacheable and above a threshold size. In other implementations, content objects are determined to be delayable according to an associated file type. For example, it can be desirable to consider all streaming video file types as delayable, all VoIP data as non-delayable, etc. In yet other implementations, content objects are determined to be delayable according to an associated originating content source 160. For example, it can be desirable to consider all data as delayable when it originates from a particular CDN, a particular media streaming or large-format media delivery website, etc.

In still other implementations, content can be explicitly identified as delayable by a content server 160, the server system 140, or a user system 110. Certain embodiments allow subscribers to decide whether to receive requested content at the time it is requested, to delay receipt of the requested content, and/or to receive similar content now or later. When a subscriber opts to delay receipt of the requested content, an indication can be communicated from the subscriber's user system 110 to the server system 140, causing the request handler 442 identify the requested content as delayable content. Each of these and other selections can impact how requests are processed, content that is requested from content servers 160 and/or delivered to the user systems 110, affects on one or more subscribers' accounting, etc.

In some embodiments, the request handler 442 includes functionality of or is in communication with the account manager 446. In some implementations, each subscriber or groups of subscribers have contractual relationships with the communications services provider. For example, subscribers can be associated with a plan that guarantees them a certain amount of resources (e.g., a total bandwidth consumption cap per month) for a certain price. Various plans can be offered, and various interactions can affect plan pricing, content delivery, etc. For example, subscribers can be able to pay extra for certain content (e.g., on-demand movies, pay-per-view events, etc.) or make decisions that reduce the impact of content delivery on their caps.

In one embodiment, the account manager 446 collects data from multiple components to determine how much network usage to attribute to a particular user. For example, the account manager 446 can determine how to count upload or download traffic against a user's fair access policy (FAP). In another embodiment, the account manager 446 dynamically adjusts FAPs according to various network link and/or usage conditions. For example, the account manager 446 can adjust FAPs to encourage network usage during lower traffic times. In yet another embodiment, the account manager 446 affects the operation of other components of the server system 140 as a function of certain FAP and/or other accounting conditions. For example, the account manager 446 can direct the communications subsystem 412 to multicast certain types of data or to prevent certain users from joining certain multicast streams as a function of FAP or other considerations.

There are many ways to account for subscriber usage and to affect that accounting. For example, as described above, different types of subscriber interactions with the communications infrastructure and various types of content can be accounted for with respect to the user's FAP, bandwidth usage, bandwidth provisioning, service fees, etc. Accordingly, references herein to a "hit to a user's FAP," a "hit to a user's bandwidth cap," and "account hit," or other similar phrases are intended generally to include any type of accounting related and/or resource-provisioning related impact to a subscriber.

According to some implementations, various factors result in a determination as to whether data is unicast or multicast. For example, all non-cacheable data and watch-now cacheable data is unicast, and all other data is multicast. Any unicast data is counted against the subscriber's plan. For multicast data, different approaches are available. According to some approaches, multicast data is counted at a reduced rate or is offered for free. According to other approaches, multicast data is priced according to when it is used and/or by how many subscribers.

It is worth noting that embodiments of the account manager 446 can be used to facilitate many different types of functions relating to subscriber accounts. Some embodiments keep track of subscriber usage and subscription limits, and notify other components of the server system 140 accordingly. Other embodiments handle subscriber credentials, digital rights management issues, and/or the like to police the types of content that can be received from and/or sent to subscribers. For example, a subscriber can request a content channel only available to certain subscription levels, content requiring a login or other credentials, content from blocked or throttled websites, etc. Still other embodiments handle groups of subscribers, subscriber preferences, etc.

Many of the functions described herein are facilitated by embodiments of the storage manager 444 exploiting resources of one or more data stores of a storage subsystem 430. The storage subsystem 430 can include storage resources in the core nodes 425 and/or provided via media cloud services 440. In some embodiments, the storage subsystem 430 includes storage resources of the gateways 165 or other components (though not shown). Some embodiments facilitate extended subscriber storage, such as for subscriber-owned photos, movies, documents, etc. Other embodiments of the storage manager 444 use the storage subsystem 430 to facilitate edge server functionality, CDN functionality, or the like. The storage subsystem 430 can include any useful types of data storage, including, for example, servers, queues, buffers, drives, and/or the like.

Some embodiments of the storage subsystem 430 also include subscriber dictionaries 560. Embodiments of the server optimizer 150 (e.g., the storage manager 444) use various dictionary coding techniques to provide functionality, such as monitoring contents of subscribers' home CDNs 125, identifying redundancies between incoming data and data previously sent across the links of the communication system, etc. In particular, various techniques (e.g. delta coding, wide dictionary coding, etc.) can allow identification of redundancies in or matches between byte sequences traversing the links. These techniques can be used to identify and exploit opportunities for multicasting (e.g., delaycasting) to increase utilization of the communications links.

"Delta coding," "dictionary coding," "dictionary," and other similar terms and phrases are intended to be broadly construed to include use of any type of dictionary-like structure for optimization. Embodiments of the dictionary include chunks of content data (e.g., implemented as delta dictionaries, wide dictionaries, byte caches, and/or other types of dictionary structures). When content data is stored in a dictionary (e.g., subscriber dictionaries 560), some or all of the blocks of data defining the content can be stored in the dictionary in an unordered, but indexed way. As such, content may not be directly accessible from the dictionary; rather, the set of indexes can be used to recreate the content from the set of unordered blocks. Additionally or alternatively, the subscriber dictionaries 560 can be used to store fingerprints (e.g., hashes, digests, signatures, or the like) of content blocks, the order in which blocks were received, and/or other information (e.g., error correction codes, user preferences, etc.).

Embodiments of the server optimizer 150 generate fingerprints of content passing through the server system 140. For example, as data passes through the request handler module 442, the data packets are intercepted, a determination is made as to whether the data is cacheable, content is parsed from cacheable packets (e.g., header information is removed), and fingerprints are generated from the parsed content. Implementations intercept and analyze the byte-level data of the content portion of cachable objects in a way that is substantially transparent to the user. The fingerprints can be generated in any way that is useful in providing functionality described herein. For example, hashing functions are applied to traffic for use as identifiers (e.g., "weak" identifiers) that are at least strong enough to identify candidate matches between blocks downloaded by the server optimizer 150 in response to a request and blocks previously stored at the client optimizer 120 (e.g., at an associated home CDN 125). Some embodiments of the fingerprints are generated so as to be useful further as strong identifiers for representing substantially identical matching blocks.

According to some embodiments, the storage manager 444 is configured to prepare downloaded data into blocks by deterministic chunking. As used herein, "deterministic chunking" broadly includes any technique for generating a block of data in a deterministic enough way to be useful in regenerating comparable fingerprints. For example, data is downloaded and chunked into Block A and Block B, and fingerprints are generated for Block A and Block B. Later, the same data is downloaded again and chunked again into Block C and Block D. Embodiments use deterministic chunking techniques to ensure with substantial certainty (i.e., a very small error rate) that fingerprints generated for Block A and Block B upon the first download are substantially equivalent to fingerprints generated for Block C and Block D upon the second download, respectively. In one embodiment, the deterministic chunking includes identifying a particular bit stream at which to start a block in such a way that is highly repeatable.

Certain other media services are facilitated by service flows handled at least in part by the storage manager 444 and resources of the storage subsystem 430. The term "service flow" is intended generally to include any type of queuing or related functionality, resources, etc. that facilitate communications in support of functionality described herein. For example, data may be assigned to service flows from one or more queues. Unicast and/or multicast service flows can be used to facilitate communications (e.g., via link 405) with one or more subscribers, for example, as described above with reference to FIG. 3. For the sake of illustration, communicating data to a particular subscriber can involve adding the data to a unicast service flow associated with the subscriber, adding the data to a multicast service flow to which the subscriber has subscribed, etc. The service flows can then be scheduled and delivered over the link 405 by the communications subsystem 412.

As will be described more fully below, embodiments include a novel type of service flow referred to herein as a delaycast service flow. The delaycast service flow can be used to facilitate delaycasting of delayable content for opportunistic delivery when excess bandwidth resources are determined to be presently available. Depending on the depth of content identified for the delaycast service flows (e.g., in an associated delaycast queue), delivery of that content can be delayed for different amounts of time. Certain embodiments deliver content in the order that it is requested, effectively treating the delaycast service flows like a first-in-first-out (FIFO) queues. Other embodiments use a variety of techniques to prioritize or otherwise order the content in the delaycast service flows. For example, object size, object priority, subscription type of the requesting subscriber, carrier assignment, object popularity, ability to compress the object, number of subscribers waiting for the object that can receive it (e.g., in a single beam or carrier), transmission resource efficiency (e.g., downstream info rate), and/or other factors can be used to prioritize the delaycast service flows and/or to prioritize data within each delaycast service flow. These and other factors can contribute to and/or be affected by various scoring techniques. Accordingly, content scoring functionality of embodiments of the request handler 442 are configured to monitor and handle delaycasting.

Certain embodiments use multiple delaycast service flows in different ways. Some implementations have separate delaycast service flows associated with different spot beams and/or carriers. For example, this can allow different prioritizations of content on different spot beams and/or carriers according to different associated subsets of subscribers, determinations of different amounts of presently available excess bandwidth on different spot beams and/or carriers, etc. Other implementations have separate delaycast service flows associated with different priority levels. For example, it can be desirable to have a high-priority and low-priority delaycast service flows associated with different rules or constraints (e.g., data in the high-priority delaycast service flow is sent over any excess bandwidth at any time of day, while data in the low-priority delaycast service flow is sent only when a certain threshold amount of excess bandwidth is available and only at certain off-peak times of day). Alternatively or additionally, multiple delaycast queues can be used to feed the different delaycast service flows in different ways.

The various types of storage provided by the storage subsystem 430 can be used together to effectively handle different types of communications in different ways. In some implementations, all content that is determined to be delayable is automatically placed in one or more delaycast service flows. In other implementations, delayable content is placed in the delaycast service flows only after further criteria have been met indicating that delivery of the content should, in fact, be opportunistically delayed (e.g., the data is queued and moved from the queue to the service flow when appropriate). Any content that is not placed in the delaycast service flows can be placed instead in one or more other service flows.

In a first illustrative scenario, a first subscriber requests download of an email. It can be determined that the email is non-delayable and/or non-cacheable, so that it is appropriate to deliver the email only to the requesting subscriber and to attempt delivery as soon as possible in response to the request. The email content can be assigned to a unicast service flow associated with the requesting subscriber, and scheduled for delivery (e.g., using private IP). In a second illustrative scenario, the first subscriber requests download of a popular movie. It can be determined that the movie is non-delayable (the requester wants to watch the movie now), but the content is cacheable. Accordingly, it can be appropriate to deliver the movie to all subscribers sharing the requester's carrier as a multicast communication (e.g., for immediate viewing by the requester and for opportunistic caching by the non-requesting subscribers). The movie content can be assigned to one or more multicast service flows and scheduled for immediate delivery. In a third illustrative scenario, the first subscriber requests download of a popular movie, but agrees to delay delivery of the movie for a reduced account hit. It can be determined that the movie is delayable and cacheable. Accordingly, it can be appropriate to deliver the movie to all subscribers sharing the requester's carrier as a multicast communication, but that delivery can be delayed for some time. The movie content can be assigned to one or more delaycast service flows for opportunistically delayed delivery.

As described above, embodiments of the server system 140 receive content data from content sources 160 that can be destined for one or more subscribers (e.g., one or more user systems 110 in a spot beam 210, as described with reference to FIG. 2). The content sources can include content aggregators 462 (e.g., an Internet movie subscription site), CDNs 464, and/or any other types of content sources (e.g., sources having a peering relationship with the server system 140, etc.). As illustrated, the content sources 160 can be in communication with the core nodes 425 and/or with the media cloud services 440. In some embodiments, additional components are included for interfacing with the content sources 160. Interface components can include network switches, routers, edge servers, traffic shapers, etc. For example, third-party edge servers can be adapted to mirror content (e.g., implementing transparent mirroring, like would be performed in a point of presence ("POP") of a CDN) to the server system 140 by facilitating contractual relationships between content providers and service providers to move content closer to users in a communications network. Traffic shapers can control traffic flow through the server system 140, for example, to help optimize performance of the communications system (e.g., by reducing latency, increasing effective bandwidth, etc.). In one embodiment, a traffic shaper is used to delay packets in a traffic stream to conform to a predetermined traffic profile.

According to certain scenarios, the server system 140 receives data from the content sources 160 destined for one or more users in response to explicit requests by the one or more users. The server system 140 intercepts the data using the intercepter 434, processes the data as appropriate (e.g., using components of the server optimizer 150), and can re-serve the data using embodiments of the media server 432. For example, a user's selection of a television channel, on-demand video, website, and/or other content can result in a request to and a response from a content source 160. According to other scenarios, the server system 140 receives data from the content sources 160 destined for one or more users in response to implicit requests by the one or more users. For example, user profiles or preferences, content request trends, and/or other techniques can be used to anticipate or assume implicit requests by users for content. According to still other scenarios, the server system 140 receives data from the content sources 160 destined for one or more users without any relation to a request. For example, broadcast content, certain anticipatory content, and/or other types of content can be communicated over the communications system on behalf of the communications service provider and/or one or more content service providers (e.g., served by the media server 432).

According to yet other scenarios, a content request is issued by the server system 140. For example, the server system 140 maintains a queue of identifiers corresponding to various delayable content objects, and the queue is ordered according to some priority. When the server system 140 determines that excess capacity is presently available on a forward communications link, it can identify a next-scheduled content object from the queue of identifiers. The server system 140 can then request the associated content object from one or more content sources 160. When the requested content object is received at the server system 140, it can be assigned to a delaycast queue and/or one or more delaycast service flows for opportunistic delayed delivery over the forward communications link having the excess capacity.

In some embodiments, content received in response to a user request (e.g., explicit and/or implicit) is intercepted by the intercepter 434 and processed by the request handler 442. For example, the request handler 442 can analyze the content to determine if it is in response to a request, whether it satisfies the request, etc. The request handler 442 can also analyze the received content to make determinations relating to whether the content objects are delayable, cacheable, compressible, etc. For example, the request handler 442 can determine actual or predicted object sizes, object contents (e.g., genre, file type, etc.), and/or any other characteristic of the content that is useful for acceleration, optimization, or other functions of the server optimizer 150. In some embodiments, the request handler 442 uses other component functionality, such as the account manager 446, for further handling of the content. In one example, as content is received, scoring-related records are maintained, updated, etc. by the request handler 442. In another example, as content is received, the account manager 446 updates accounting records based on the analyzed object data.

Functionality of the server optimizer 150 can be used to determine which content objects to assign to particular queues or service flows, which content to send over the communications links 405, and to which user or users, etc. In determining how to communicate the content objects over the communications links 405, additional determinations can be made by the server optimizer 150 or other components of the server system 140. For example, it can be desirable to determine whether content should be unicast or multicast and according to which protocol, how content should be modulated and/or encoded, how content should be assigned to one or more spot beams and/or carriers, how content should be reformatted (e.g., compressed, transcoded, etc.), etc. In some embodiments, some or all of these and other functions are provided by the communications subsystem 412. In other embodiments, certain of these determinations are made by the server optimizer 150, and others are made by the communications subsystem 412.

For the sake of illustration, embodiments of the communications subsystem 412 apply one or more transport protocols to content being sent to one or more subscribers over the communications links 405. Some implementations apply one or more unicast or multicast protocols to facilitate corresponding service flows, prepare datagrams by generating header information and packets of particular formats, etc. Other implementations apply one or more modcodes to the data (i.e., modulation and/or encoding schemes). The modcodes may, for example, be applied as a function of the type of data being sent (e.g., higher priority data can be sent with more robust modcodes), link conditions (e.g., more robust modcodes can be used with poor link conditions, such as high detected bit errors resulting from rain fade), etc. In some cases, the communications subsystem 412 monitors link conditions and dynamically and adaptively applies modcodes according to changes in link conditions (e.g., using adaptive coding and modulation (ACM) techniques). Protocol application can further include applying progressive encoding techniques (e.g., using progressive video encoding for base and enhancement video layers), applying encryption or other rights management (e.g., digital rights management (DRM)), etc. Embodiments of the communications subsystem 412 feed information back to the server optimizer 150 for optimizing subscriber assignments.

When content traffic is has been prepared for communication, embodiments of the communications subsystem 412 can schedule transport over the link 405. For example, link scheduling can involve managing link bandwidth by scheduling license grants within a spot beam. In certain embodiments, the communications subsystem 412 is aware of certain contractual allowances or obligations (e.g., via communications with the account manager 446) so that the scheduling of the link can account for rate-based and/or other policy considerations. In other embodiments, this information is maintained by upstream components (e.g., the account manager 446) and control information based on this information is communicated as needed to the communications subsystem 412. Preparing the content traffic for communication over the satellite communications links can involve other functions that can be performed by the communications subsystem 412. For example, the communications subsystem 412 can oversee or implement a variety of decoding, interleaving, decryption, and unscrambling techniques for upstream traffic and/or downstream traffic.

The functionality above is largely described with reference to server-side components. Certain functionality is facilitated (or supported) by components of the user systems 110 and/or by joint functionality of server-side and client-side components. For example, client-server functionality can be facilitated by interactions between the server-side media server 432 and the client-side client application 470, with support from a number of other server- and client-side components.

Turning to the user systems 110, various implementations are possible. For example, the user system can be implemented as a subscriber modem (e.g., a satellite modem), a dedicated device, hardware or software of a set-top box, or in any other useful way. In one illustrative implementation, the user system 110 is embodied in a subscriber modem that includes a client optimizer 120 (e.g., as integrated hardware and/or software) and has one or more ports for communicating with a home CDN 125 and one or more CPEs 130. For example, the subscriber modem has a universal serial bus (USB) port, and the home CDN 125 is implemented on a USB thumb drive. In other implementations, the home CDN 125 can be implemented using internal storage of the modem or as other types of removable storage, networked storage, etc. The CPEs 130 can include televisions or video monitors, computers (e.g., laptops, tablets, etc.), smart phones, smart appliances, and/or any other equipment that can benefit from services provided over the communications infrastructure (and/or support equipment thereto).

Similar to the server-side functions described above, the client-side functions can be considered as transport layer 410, media layer 420, and content layer 460 functions. At the transport layer 410, data communicated over the communications link 405 can be handled using a communications subsystem 414. In some embodiments, the communications subsystem 414 of the user system 110 performs similar or identical functionality to that of the communications subsystem 412 of the server system 140. For example, when a signal is received via the communications subsystem 414, the communications subsystem 414 can amplify the signal, acquire the carrier, downconvert the signal, etc. Though not explicitly shown, other components and/or component functionality can be provided by the communications subsystem 414. For example, a media access control (MAC) module can provide certain network interface functionality, such as modulating, encoding, filtering, decrypting, and/or otherwise processing data. Other functionality can be provided by routers, switches, and/or the like. These and or other components can also process data upon receipt and/or prior to transmission using techniques, such as modulating and demodulating, encoding and decoding, multiplexing and de-multiplexing, filtering, parsing, packetizing, etc.

Embodiments of the communications subsystem 414 can also include other communications functionality for supporting local and/or other networking. In some embodiments, the communications subsystem 414 includes a hub, router, or the like for supporting a local area (e.g., WiFi) network. In other embodiments, the communications subsystem 414 supports other types of wired or wireless functions, such as Bluetooth, Ethernet, femtocell, or other functionality.

Media layer 420 functionality of the client system can be handed by a client optimizer 120 and a home CDN 125. The client optimizer 120 can be tailored to provide support for the media and related services facilitated by the server optimizer 150, including those described above. For example, the client optimizer 120 can perform functions relating to WAN/LAN, and/or other acceleration functionality as a proxy, an in-line accelerator, etc. As illustrated, the client optimizer 120 includes a request handler 450 and a storage manager 452. In some embodiments, the request handler 450 of the user system 110 performs at least functions that are complementary to those of the request handler 442 of the server system, and the storage manager 452 of the user system 110 performs functions that are complementary to those of the storage manager 444 of the server system.

In general, embodiments of the request handler 450 can bridge interactions between users and the user system 110 with interactions between the user system 110 and the communications infrastructure. For example, the request handler 450 can interact with users via one or more graphical user interfaces GUIs (e.g., via a CPE 130) to receive content requests, interpret those user requests, and handle (e.g., fulfill) those user requests locally and/or via the communications infrastructure (e.g., by fulfilling content requests via the home CDN 125, prompting the user for additional information via the CPE 130, issuing requests over the communications infrastructure, etc.).

Many of the functions described herein are facilitated by client-side storage, referred to herein as the home CDN 125. The home CDN 125 can include any types of storage, and those types of storage can be spread across one or more devices in one or more locations. For example, the home CDN 125 can include volatile or non-volatile storage, servers, files, queues, etc. implemented in or in communication with a subscriber modem, a set-top box, a local or non-local network, a CPE 130, etc. The data stores can be fully integrated and/or co-located, implemented as internal hard-disk drives, internal solid-state memory, attached peripherals (e.g., thumb drives, USB hard drives, etc.), wireless or networked peripherals (e.g., wireless drives, storage area networks, etc.), cloud storage, etc. Some functionality involves ensuring that certain types of data are stored locally.

In various implementations, data is organized in different ways and/or additional data is stored to provide functionality, such as dictionary functionality. For example, embodiments of the home CDN 125 include subscriber libraries that store local content. The subscriber libraries can also include any type of dictionary, object or byte caching, data serving, and/or other component functionality. Components of the user system 110 (e.g., the client optimizer 120) can be configured to exploit those data features to provide additional functionality, such as delaycasting, dictionary synchronization, acceleration, etc. For example, dictionaries of block-level fingerprints (e.g., hash checksums, or the like) can be maintained and periodically uploaded to the server system 140 to inform the server system 140 about the contents of the subscriber libraries in the home CDN 125.

In some embodiments, the storage manager 452 maintains, affects, and/or communicates information relating to the data stored in the home CDN 125. For example, the storage manager 452 can upload information to the server system 140 (via other components) to indicate when data is added to the subscriber libraries (e.g., in the form of an ACK or similar message), when data is removed from the subscriber libraries, etc. Embodiments of the storage manager 452 can also determine when newer content objects should replace older content objects in the subscriber libraries, when content objects in the subscriber libraries have become stale (e.g., because the content or related rights have expired, because newer version of the content exist, because the content is associated with a limited valid timeframe, etc.), when additional data is needed to fill in holes in content objects stored at the subscriber libraries, etc.

As illustrated, user interactions typically occur at the content layer 460 via one or more CPEs 130. The CPEs can include any content-enabling device, such as a computer (e.g., tablet, laptop, etc.), television, set-top box, smart phone, media player, etc. Embodiments of the CPEs 130 include at least one client application 470 for facilitating media services or related functionality. In some embodiments, the client application 470 is a web browser. In other embodiments, the client application 470 includes software code configured to run on a processor of the CPE 130 (e.g., on a set-top box).

Some implementations provide different content communication paths between components of the user system 110. For the sake of illustration, suppose a user requests a movie using a GUI displayed via a CPE 130 (e.g., a television). If the request is for a private video file (e.g., a home movie, a purchased video, etc.) stored on the user's digital video recorder (e.g., the DVR is implemented as part of the home CDN 125), some implementations can allow the request to be handled directly by the DVR. For example, the DVR is part of a set-top box that handles the request without assistance from other components of the user system 110. Alternatively, the request is processed by the request handler 450, which determines that the subject of the request is locally available and directs the request to be fulfilled locally (the request handler 450 can also log the request, communicate details about the request to the server system 140 for statistical processing, etc.). If the request is for other types of movies, the request handler 450 can determine whether to fulfill the request locally, to process the request over the communications infrastructure (e.g., issue a request to a remote content source via the server system 140), to partially fulfill the request locally and fill in missing data using requests over the communications infrastructure, etc.

The architecture 400 described above is one of many possible architectures for performing the functions described herein. For example, each component can be implemented in different ways, including using one or more components, hardware and/or software, custom and/or off-the-shelf components, etc. Accordingly, though embodiments are described herein with reference to particular components providing particular functionality as part of particular subsystems, similar functionality can be provided in other ways (e.g. by other components and/or at other locations in the architecture) without departing from the scope of embodiments. Further, though some components are similarly named in the server system 140 and the user systems 110, the similarity in names is intended only to add clarity and simplicity to the disclosure and not to imply that the components are implemented identically or perform identical functionality. Even further, the server system 140 and the user systems 110 can perform many other types of functionality and/or can include other components not discussed above.

FIG. 5 shows an illustrative computational system 500 for implementing functionality of a server system 140, a user system 110, or components thereof, according to various embodiments. The computational system 500 can include or perform functionality of components of server system 140 or user system 110 embodiments, such as those described above in FIGS. 1-4. Embodiments of the computational system 500 can be implemented as or embodied in single or distributed computer systems, or in any other useful way. The computational system 500 is shown including hardware elements that can be electrically coupled via a bus 555.

The hardware elements can include one or more central processing units (CPUs) 505, one or more input devices 510 (e.g., a mouse, a keyboard, etc.), and one or more output devices 515 (e.g., a display device, a printer, etc.). The computational system 500 can also include one or more storage devices 520. By way of example, storage device(s) 520 can be disk drives, optical storage devices, solid-state storage device such as a random access memory (RAM) and/or a read-only memory (ROM), which can be programmable, flash-updateable and/or the like. In some embodiments, the storage devices 520 include or are in communication with the storage modules 550 of the server system 140 or the home CDN 125 of the user system 110, as described above.

The computational system 500 can additionally include a computer-readable storage media reader 525a, a communications system 530 (e.g., a modem, a network card (wireless or wired), an infra-red communication device, etc.), and working memory 540, which can include RAM and ROM devices as described above. In some embodiments, the computational system 500 can also include a processing acceleration unit 535, which can include a DSP, a special-purpose processor and/or the like.

The computer-readable storage media reader 525a can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information. The communications system 530 can permit data to be exchanged with a network (e.g., content network 155, satellite links, etc.) and/or any other computer described above with respect to the computational system 500. For example, as described with reference to FIGS. 1-4, content traffic and/or other information can be communicated among various portions of the communications infrastructure via the communications system 530.

The computational system 500 can also include software elements, shown as being currently located within a working memory 540, including an operating system 545 and/or other code 550, such as an application program (which can be a client application, web browser, mid-tier application, relational database management system (RDBMS), etc.). In some embodiments, one or more functions of the client optimizer 120 or the server optimizer 150 are implemented as application code 550 in working memory 540.

It should be appreciated that alternate embodiments of a computational system 500 can have numerous variations from that described above. For example, customized hardware might also be used and/or particular elements might be implemented in hardware, software (including portable software, such as applets), or both. Further, connection to other computing devices such as network input/output devices can be employed. In various embodiments a computational system like the one illustrated in FIG. 5 is used to implement one or more functions of a user system 110 or server system 140, and the computational system is in communication with other functional components as needed or desired. In other embodiments, computational systems like the one illustrated in FIG. 5 are used to implement one or more methods of the system, such as those described below.

As discussed above, embodiments seek to address issues relating to sub-optimal bandwidth resource usage in a communications infrastructure. A typical communications infrastructure having a large number of users tends to experience varying demand on its resources over time. Over the course of a day, there can be periods of time during which communications infrastructure resources are in relatively high demand, and other periods of time during which those resources are in relatively low demand.

Figure 6:
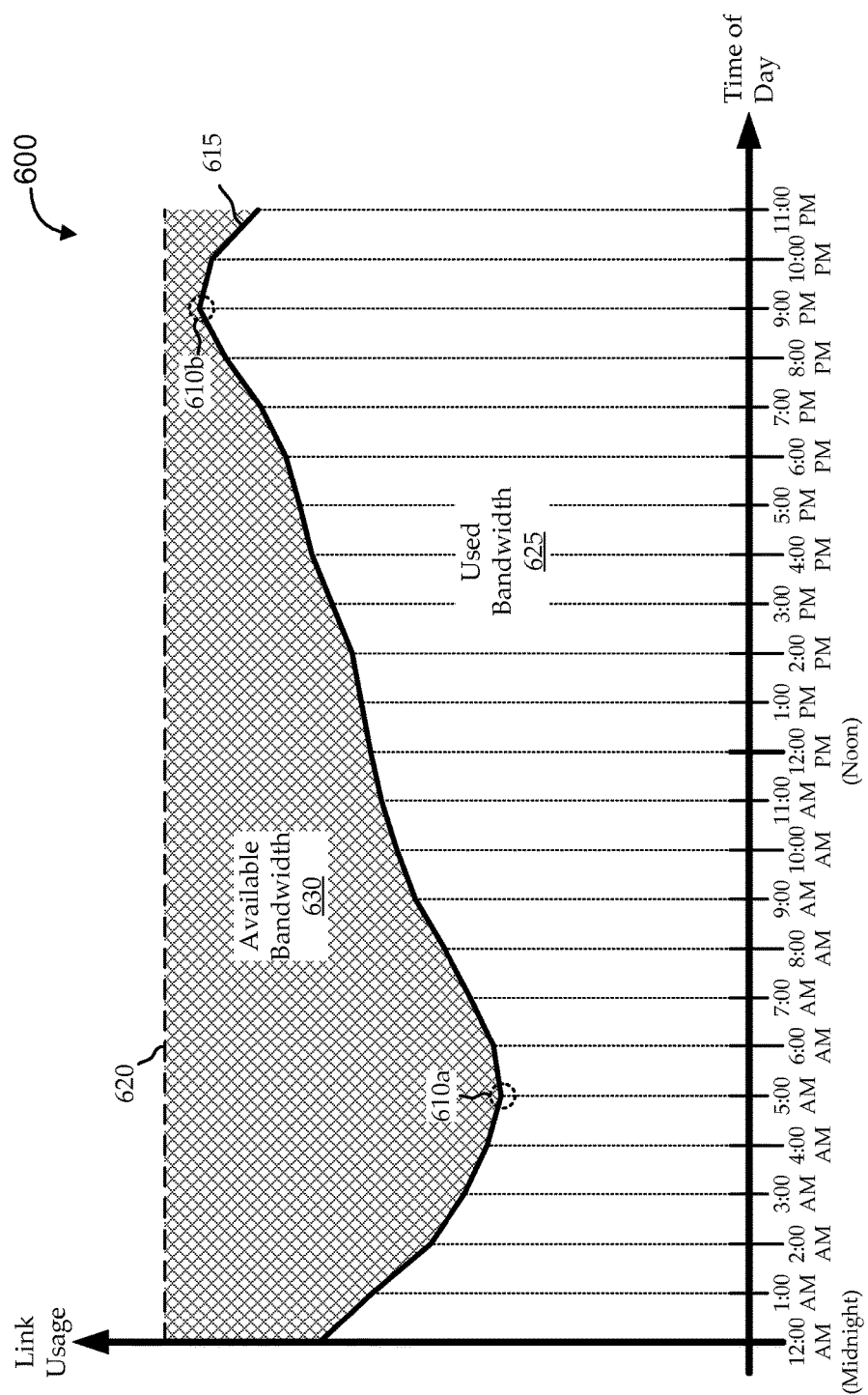
FIG. 6 shows a graph of bandwidth resource usage for a typical communications system over the course of an illustrative day.

FIG. 6 shows a graph 600 of bandwidth resource usage for a hypothetical communications system over the course of an illustrative day (e.g., a "residential provisioning curve"). The graph 600 plots link usage (e.g., the amount of bandwidth used on the link) at each hour of a day on a curve 615. The graph 600 is intended merely to illustrate certain points for the sake of added clarity and should not be construed as suggesting any absolute values, scales, proportions, or the like. Generally, as illustrated by the curve 615, demand for resources tends to decrease overnight, reaching a minimum 610a while most people are asleep. Demand then tends to increase throughout the day, reaching a maximum 610b in the late evening when the largest number of people is consuming resource-intense media, like streaming movies, online video games (e.g., massively multiplayer online games), and the like.

Certain geographic considerations can also have an impact on demand. For example, the times listed on the x-axis of the graph 600 can represent times in the Eastern Time zone. Accordingly, the minimum demand 610a can be experienced at "5:00 am" because this time actually represents a set of times including 2:00 am on the West coast and 6:00 am on the East coast. For example, at "2:00 am" on the graph 600, it can still be 11:00 pm on the West coast, when many West-coast subscribers are still consuming large amounts of resource-intensive content.

In the simplified scenario represented by the graph 600, it is assumed that there is a relatively consistent maximum infrastructure bandwidth for the communications system, represented by dashed line 620. In a real-world environment, determining the effective maximum available infrastructure bandwidth at any given moment can be more complex. One complexity arises from the likely difference in available bandwidth between different carriers and different spot beams. Certain functionality can be concerned only with available bandwidth on a particular carrier of a particular spot at the time of the determination. Other functionality (e.g., determining how to assign subscribers to carriers, when and what to multicast, etc.) can be concerned with relative or combined bandwidth availability over multiple carriers or spot beams. Still other functionality can be concerned with how capacity is changing over time, in comparison to the same time on a different day, over longer periods of time, etc. Another complexity of determining currently available bandwidth is that the available actual bandwidth can be different from the available effective bandwidth. For example, changes in link condition can cause changes in the amount of content that can be sent through the same amount of bandwidth (e.g., because more retransmits are needed, more robust modcodes create more overhead, etc.). Further, other types of signaling not used for content communications can consume bandwidth resources in an inconsistent way over time.

This information can be used for provisioning a communications infrastructure, such as the ones illustrated in FIGS. 1-4. For example, some or all of the bandwidth resources below curve 615 can be considered "provisioned" bandwidth, while the bandwidth above curve 615 can be considered "un-provisioned" bandwidth. As illustrated by curve 615, link usage changes over time with reference to the maximum available bandwidth 620. This can manifest as a dynamically changing amount of un-provisioned bandwidth. It can be desirable to maximize the amount of bandwidth being used at any given time, so that any unused bandwidth can be considered sub-optimal (e.g., as a lost opportunity to use resources of the infrastructure). Embodiments seek to consume the otherwise-unused resources by employing delaycasting and/or other techniques to exploit un-provisioned and/or provisioned bandwidth where possible.

As illustrated, resources below curve 615 represent "used bandwidth" 625 (i.e., those resources that are presently being used), and the resources above curve 615 represent "available bandwidth" 630 (i.e., those resources that are determined to be presently available). Some embodiments seek to maximize the used bandwidth 625 and minimize the available (i.e., unused) bandwidth 630 at any given time using one or more opportunistic techniques. Certain opportunistic techniques can exploit time shifting, for example, by opportunistically delaying delivery of content in one or more ways (e.g., using delaycasting). Certain other opportunistic techniques can exploit demand shifting, for example, by opportunistically multicasting requested content to non-requesting terminals for local caching in anticipation of future requests by those terminals.

For the sake of illustration, various use cases can be considered in context of available resources. Suppose a subscriber of media services requests a particular movie at 7:00 pm (i.e., when un-provisioned bandwidth 630 is available, but limited). In one scenario, it is determined that the movie is fully cached that the subscriber's home CDN 125, and the request can be locally fulfilled from there without using any of the used bandwidth 625 or the available bandwidth 630. In another scenario, it is determined that the movie is partially cached in the subscriber's home CDN 125, but the un-cached portion can be easily communicated (e.g., multicast) to at least the requesting subscriber within the presently unused, available bandwidth 630. In yet another scenario, it is determined that too much of the requested movie is missing from the subscriber's home CDN 125 (e.g., or none of the movie is in the subscriber's home CDN 125), so that the request cannot be fulfilled within the presently unused, available bandwidth 630. In that scenario, the subscriber can be given the option to get the requested movie now using their provisioned bandwidth (e.g., with an associated FAP hit) or to get the movie later (e.g., with no FAP hit or a reduced FAP hit) as bandwidth becomes available. If the subscriber opts to receive the movie later, the data can be opportunistically communicated over any unused bandwidth 630 that becomes available over some extended timeframe (e.g., over the next 24 or 48 hours).

Figure 7:
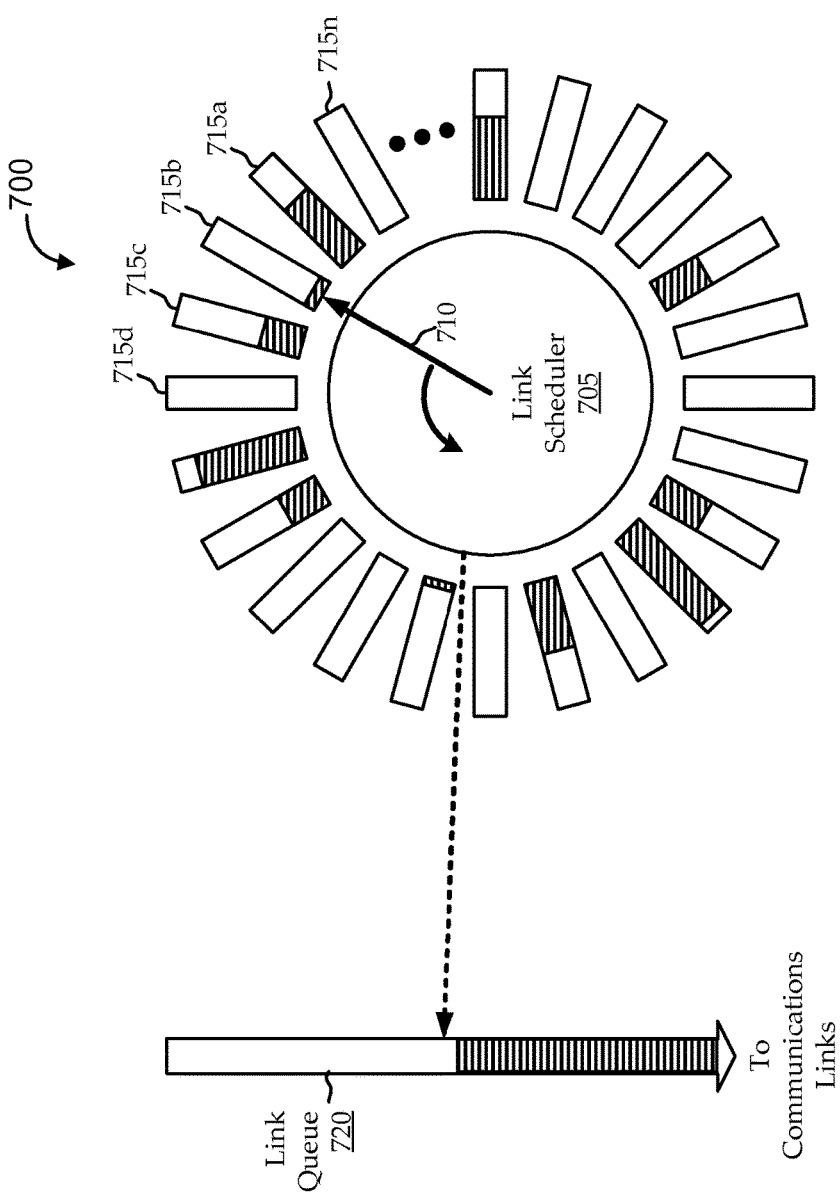
FIG. 7 shows a simplified diagram to illustrate scheduling without delaycasting functionality using a link scheduler module.
Figure 8:
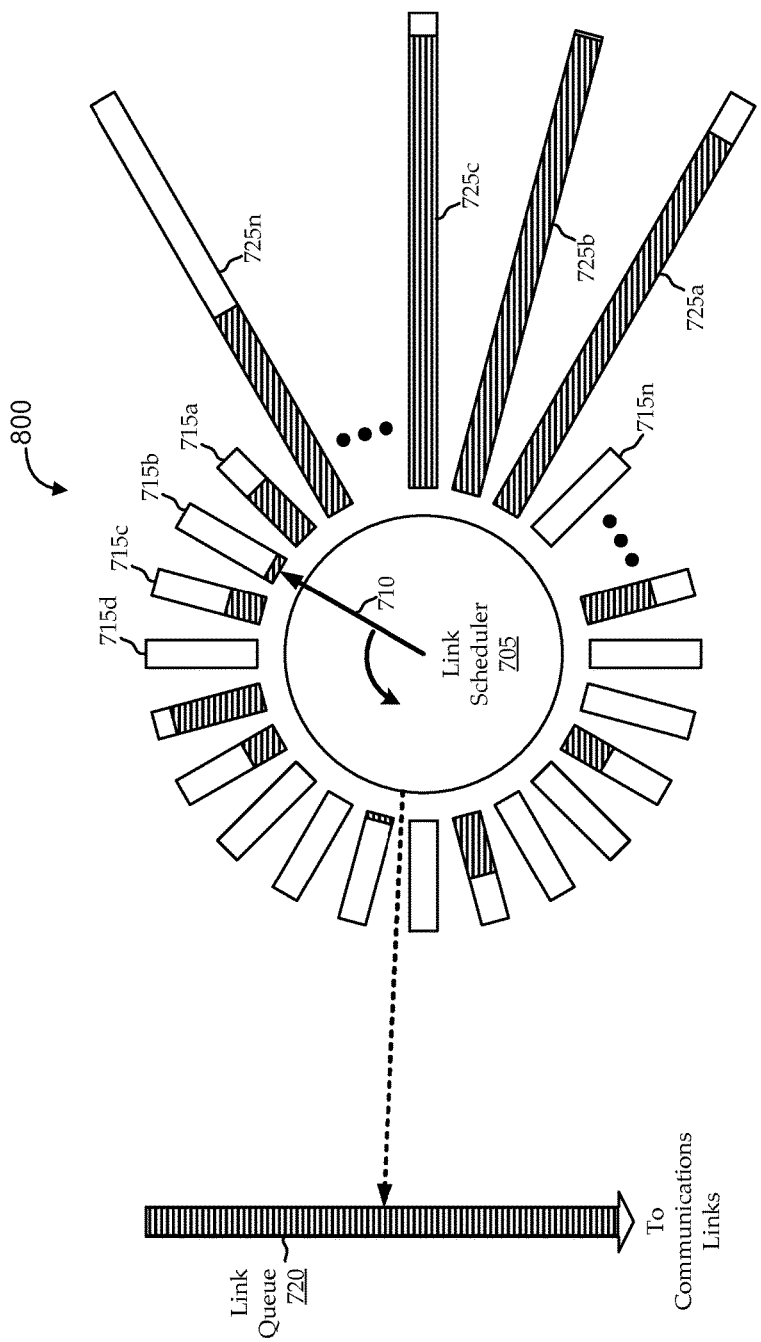
FIG. 8 shows a simplified diagram to illustrate scheduling with delaycasting functionality using a link scheduler module, according to various embodiments.

For added clarity, FIGS. 7 and 8 show illustrative scheduling with and without delaycasting functionality, respectively. Turning first to FIG. 7, a simplified diagram 700 illustrates scheduling without delaycasting functionality using a link scheduler 705. For example, the link scheduler 705 can be part of the communications subsystem 412 shown in FIG. 4. The diagram 700 is only provided to add clarity to the description by representing certain functionality and should not be construed as representing any actual implementation of that functionality. Functionality of embodiments of the link scheduler 705 can be illustratively described as similar to a clock. Surrounding the "clock" is a number of service flows 715, such as those described with reference to FIG. 4.

At any particular scheduling time, the link scheduler 505 is pointing to a particular service flow 715, represented by arrow 710. The arrow 710 can move serially around the "clock" through the various service flows 715. For example, implementations can move through the service flow 715 in a sequential order, in a dynamic order determined by priority or some other factor, etc. Each service flow 715 can be ordered by priority or in any other useful way. Notably, some service flows 715 are fuller than others, represented by different amounts of each service flow 715 being shaded. For example, one service flow can be a unicast service flow supporting a subscriber's real-time, resource-intensive use of the communications infrastructure (e.g., by requesting large, non-delayable objects, by engaging in real-time, interactive uses of the network, etc.); while another service flow can represent a multicast of a single, relatively small object. Notably, as conditions change (e.g., as priorities change, as new service flows are created, as service flows are removed, etc.), the orders and types of service flows 715 around the clock can change.

The link scheduler 705 can access each service flow 715 in turn, repeatedly circling the "clock." As the arrow 710 points to each service flow 715, it pulls the next-scheduled packet (e.g., or data block, etc.) from the service flow 715 and prepares the packet to be sent over the communications infrastructure. For example, the link scheduler 705 can place each packet into a link queue 720 associated with one or more carriers on one or more spot beams associated with the one or more destination users. As the link scheduler 705 circles the "clock," it continues to fill the link queue 720 until no content remains to be scheduled or the link queue 720 fills up.

While excess bandwidth is available, the link scheduler 705 can continually empty the service flows 715 into the link queue 720 without filling the link queue 720 (i.e., requests can be processed and fulfilled without using all available bandwidth resources). For example, the link scheduler 705 points to a first service flow 715a, then a second service flow 715b, and then a third service flow 715c, extracting data from each to place in the link queue 720. When the link scheduler 705 reaches the fourth service flow 715d, it finds the queue empty. The link scheduler 705 can move past the fourth service flow 715d with little or no hit to the infrastructure resources. In this type of condition (e.g., subscriber queues are filling slower than they can be emptied, many are empty, etc.), excess bandwidth can be available.

Some traditional approaches seek to fill a portion of the excess bandwidth by pre-scheduling a content set of a predetermined size to be pushed over the communications links over a predetermined block of time. For example, suppose the graph 600 of FIG. 6 represents all days (i.e., there is little fluctuation from day to day), and the total bandwidth of a carrier (represented by dashed line 620) is one-hundred Megabits per second ("100 Mbps"). Suppose further that over a predictable block of three hours (e.g., from 3:00 am to 5:00 am), only around fifty percent of the available bandwidth is being used, so that at least around 135 Gigabytes of bandwidth is predictably available each night over that time. A traditional approach can involve scheduling around one-hundred Gigabytes of data to be delivered over the communications links during the three-hour block of time in the middle of each night.

There are a number of limitations to this type of approach. One limitation is that, as discussed above, many factors can change the amount of bandwidth available at any particular moment. Accordingly pre-scheduling can involve maintaining a margin of unused bandwidth in case of changes in expected demand. For example, while 135 Gigabytes can be available over the three hour block on average, only one-hundred Gigabytes can be scheduled in case there is an unexpected change in demand one night. Another limitation is that, while the approach can exploit some of the excess bandwidth, there can still be a considerable amount of bandwidth that is unused throughout the day. Further, various times of day can see much larger fluctuations in link usage (e.g., from day to day), so that pre-scheduling for these times can be impractical (e.g., too risky).

FIG. 8 shows a simplified diagram 700 to illustrate scheduling with delaycasting functionality using a link scheduler 705, according to various embodiments. As with FIG. 7, the diagram 700 is only provided to add clarity to the description by representing certain functionality and should not be construed as representing any actual implementation of that functionality. Functionality of embodiments of the link scheduler 705 is again represented as a "clock" surrounded by a number of service flows 715. In addition to the traditional types of service flows 715 (e.g., unicast and multicast service flows 715) shown in FIG. 7, FIG. 8 also includes multiple delaycast service flows 725. While the delaycast service flows 725 are shown as larger than the traditional service flows 715 and all of the same size, they may alternatively be smaller than or identical to the traditional service flows 715 in terms of size, they may be different sizes from each other, etc.

As described with reference to FIG. 7, the link scheduler 705 can access each service flow 715 in turn, repeatedly circling the "clock." As the arrow 710 points to each traditional service flow 715 or delaycast service flow 725, it pulls the next-scheduled packet and places each packet into a link queue 720. As the link scheduler 705 circles the "clock," it continues to fill the link queue 720 until no content remains to be scheduled or the link queue 720 fills up. Notably, embodiments attempt to keep the delaycast service flows 725 from becoming empty by using various techniques described herein (e.g., by encouraging subscribers to delay content delivery, by finding other opportunistic uses for the queue, etc.). By keeping the delaycast service flows 725 from becoming empty, it can be possible for the scheduler to always (or substantially always) have a next-scheduled packet to move into the link queue 720.

For the sake of illustration, a communications system can typically be designed to ensure that there will always be some excess bandwidth (e.g., the graph 600 of FIG. 6 shows the curve 615 staying below the maximum line 620). While it can be inefficient to have excess bandwidth, it can be similarly undesirable to have too little bandwidth. Referring to FIG. 7, a typical condition can be one in which the traditional service flows 715 are filling at a rate that can easily be covered by the communications infrastructure. For example, the traditional service flows 715 are filling slowly enough so that the link queue 720 can output its contents to the communications links as quickly as (or more quickly than) new content is moved into the link queue 720 by the link scheduler 705. This condition can be further represented by the link scheduler 705 having some percentage of its cycles around the "clock" during which all the traditional service flows 715 are empty and have no new data to move into the link queue 720 for scheduling.

Turning back to FIG. 8, so long as some data is always waiting in the delaycast service flows 725 to be scheduled, the link scheduler 705 always has another packet to add to the link queue 720. As such, the link scheduler 705 will not have any cycles in which it adds nothing to the link queue 720, even when the other, traditional service flows 715 are empty. In this way, the delaycast service flows 725 can be used to fill excess bandwidth opportunistically (e.g., effectively "on demand" as the bandwidth becomes available at any moment) without pre-scheduling certain amounts of content for certain blocks of time.

In some embodiments, delaycast service flows 725 are also prioritized. In some embodiments, the delaycast service flows 725 all have priorities that are below those of the traditional service flows 715 (e.g., FIG. 8 illustrates the delaycast service flows 725 all coming after the traditional service flows 715). For example, if the link queue 720 begins to fill up (there is little excess bandwidth remaining), it can be desirable to ensure that real-time requests are fulfilled without interference from opportunistically delayed requests by ensuring that those corresponding traditional service flows 715 have higher priority than delaycast service flows 725. In certain embodiments, priorities can be dynamic, according to various factors. For example, content scoring can cause certain data to be assigned a high priority, thereby causing the data to be assigned to a higher priority delaycast service flows 725, re-prioritized within the delaycast service flows 725, reassigned from the delaycast service flows 725 to one or more traditional service flows 715, or otherwise handled.

Though not shown, one or more queues can feed the various service flows. For example, it can be desirable to have a delaycast queue (e.g., stored in the storage subsystem 430 of the server system 140) that can be dynamically prioritized as new requests are processed. Data from the delaycast queue can then be assigned to appropriate delaycast service flows 725 closer to when they are scheduled for delivery over the link. Additionally or alternatively, multiple delaycast queues can be used to feed one or more delaycast service flows 725, and each of the multiple delaycast queues can have the same or different priorities.

The scenarios illustrated in FIGS. 6-8 are simplified in a number of ways, including those discussed above. For example, the various scheduling determinations can be made in context of legal (e.g., contractual) or other obligations (e.g., relationship-oriented) with content providers or rights holders, infrastructure providers (e.g., if portions of the infrastructure are leased by the service provider), subscribers, etc. Further, content information is often difficult or impossible to obtain from the content packets themselves. For example, content data can be encrypted, requests or responses can be masked, etc. Even further, the service provider can have certain internal policies relating, for example, to throttling or blocking of certain types of traffic, data mining or tracking, infrastructure diagnostics or maintenance, etc.

As described above, various systems, subsystems, components, etc. can be used to implement delaycasting and related functionality. This and other functionality is further described below with reference to various method embodiments. In some cases, the method embodiments are described with reference to particular system implementations. However, embodiments of the systems described above can be used to perform functionality other than that described with reference to the methods below, and embodiments of the methods described below can be implemented using systems other than those described above.

Figure 9:
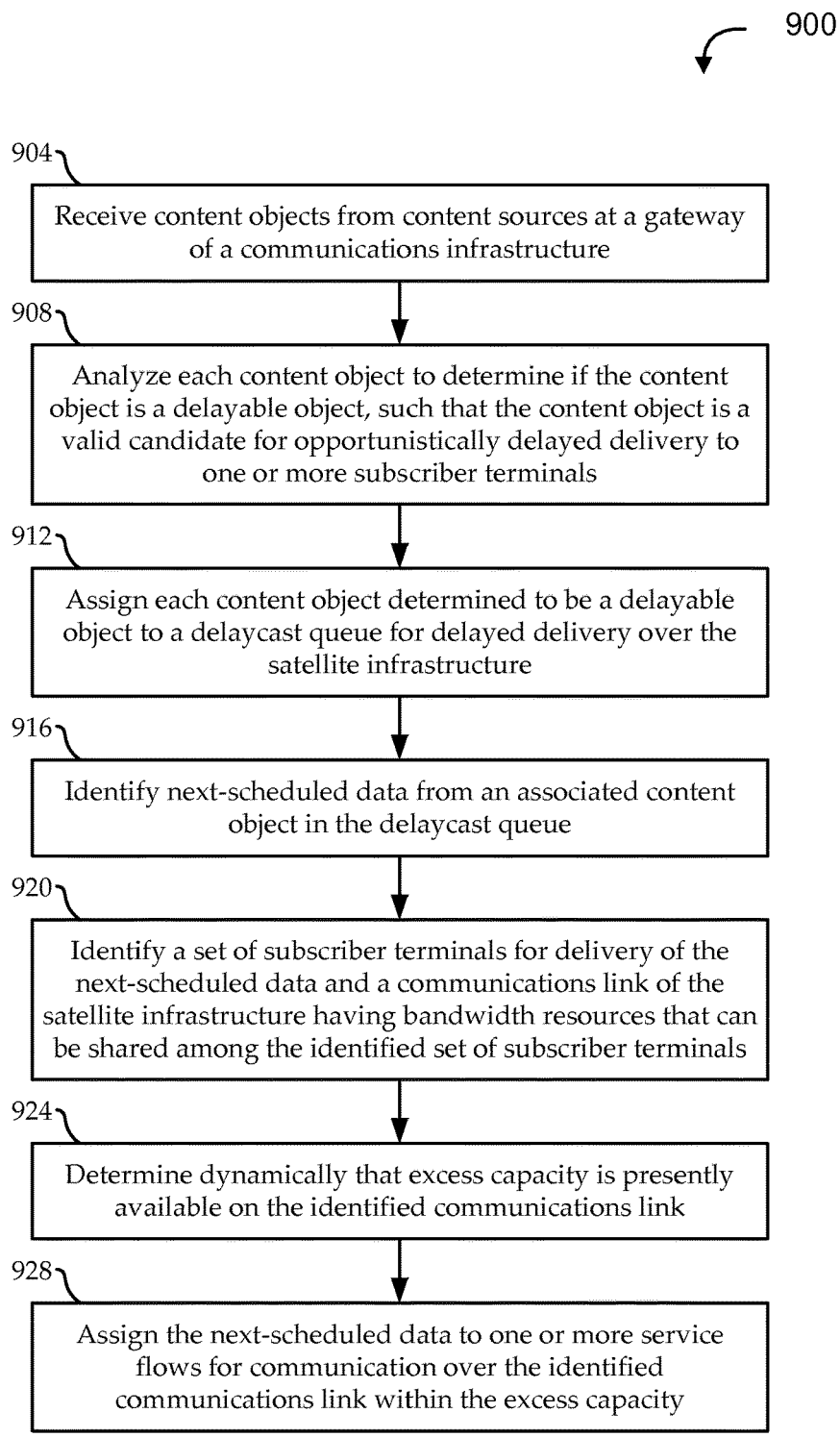
FIG. 9 shows a flow diagram of an illustrative method for implementing certain delaycast functionality, according to various embodiments.

Turning to FIG. 9, a flow diagram is shown of an illustrative method 900 for implementing certain delaycast functionality, according to various embodiments. The method 900 is described in context of a gateway operating within a satellite infrastructure. However, the same or similar techniques can be applied to any type of server system (e.g., any server systems 140, including cellular gateways, etc.) that operates within a communications infrastructure configured to provide an at least partially shared forward link to a lease some users of the link. For example, as described above, satellite and certain other wireless infrastructures can allow sharing of forward bandwidth resources using multicasting and/or other techniques.

Embodiments of the method 900 begin at stage 904 by receiving content objects from content sources at the gateway of the communications infrastructure. The content objects can be received from content servers, subscribers, etc. Further, the content objects can be received as a result of a request that originated from a subscriber, a request that originated from the gateway, pushing of content from a content server, etc.

At stage 908, each content object received at the gateway is analyzed to determine whether the content object is a delayable object. As described above, an object can be considered a delayable object if it is a valid candidate for opportunistically delayed delivery to one or more subscriber terminals. In some cases, the object is considered delayable when it is further determined to be a valid candidate for opportunistic storage local to one or more subscriber terminals and/or according to one or more other criteria. Each object determined to be a delayable object can be assigned to a delaycast queue at stage 912 for delayed delivery over the satellite infrastructure. In some embodiments, objects are only assigned to the delaycast queue at stage 912 when they are determined to be delayable and additional criteria are met indicating that the delivery of the object should, in fact, be opportunistically delayed. As discussed with reference to FIG. 8, assigning an object to a delaycast queue at stage 912 can involve assigning the object to a delaycast service flow or assigning the object to a delaycast queue for later assignment to a delaycast service flow.

At stage 916, next-scheduled data from the delaycast queue is identified. The delaycast queue typically includes data from multiple content objects that can be prioritized according to one or more schemes. Depending on the position of data for a particular content object within the delaycast queue and changing availability of excess bandwidth resources over time, different amounts of time can lapse between adding the particular content object to the delaycast queue and data of the particular content object being next-scheduled data from the queue. Accordingly, there will typically be a substantial delay between assigning the delayable object to the delaycast queue at stage 912 and identifying data corresponding to the delayable object as next-scheduled data from the delaycast queue at stage 916.

The next-scheduled data identified in stage 916 is, or is associated with, a particular delayable content object. At stage 920, characteristics of the particular delayable content object are used to identify an appropriate set of subscriber terminals to which the content object should be delivered and a communications link (e.g., a spot beam, carrier, and/or service flow) over which to deliver the content object. For example, the set of subscriber terminals can be determined as a subscriber terminal that initially requested the content object and other subscriber terminals presently tuned to the same carrier as the requesting subscriber terminal. Alternatively, the set of subscriber terminals can be determined according to subscriber preferences, contents of subscriber dictionaries, subscriber request trends or statistics, availability of subscriber terminals (e.g., whether or not the subscriber terminals detected to be in communication with the satellite infrastructure), link conditions with the subscriber terminals, etc. In some implementations, a set of subscriber terminals is determined and an appropriate communications link is identified according to the determined set of subscriber terminals. In other implementations, one or more communications links are identified and appropriate sets of subscriber terminals are determined according to the identified communications links.

At stage 924, excess capacity is dynamically determined to be presently available on the identified communications link. As discussed above, some traditional techniques pre-schedule content pre-pushing for times when a predictable amount of bandwidth is statistically guaranteed to be available (e.g., a block of resources is reserved that is smaller than the typical minimum amount of bandwidth available during a set block of time in the middle of the night). Rather that predicting that excess bandwidth will be available at some future time, embodiments dynamically determine whether excess capacity is available at the present time.

In some implementations, a link scheduler or other component actively monitors an amount of bandwidth being used and/or an amount of bandwidth available to be used in determines whether excess bandwidth capacity is available, accordingly. In other implementations, scheduling, queuing, and/or other functionality is configured to automatically exploit any excess capacity that exists (e.g., above some predetermined threshold, where desired). For example, as discussed with reference to FIG. 7B, delaycast service flows 725 can be used in context of traditional service flows 715 to fill any excess capacity determined to be on one or more communications links. In some implementations, the data from a delaycast queue is actively scheduled into a delaycast service flow 725 when an active determination is made that excess bandwidth is presently available. In other implementations, data from the delaycast queue is always scheduled to a delaycast service flow 725, though at a low priority, so that excess capacity is exploited even when no active determination is being made. Accordingly, the determination that excess capacity is presently available on the identified communications link at stage 924 can be an active determination or a passive determination.

As discussed above, determining whether excess capacity exists can involve a number of determinations. In some cases, it is determined that excess capacity is presently available only when that excess capacity is detected during particular time windows. For example, excess capacity can be used only during predetermined off-peak hours. In other cases, it is determined that excess capacity is presently available only when the excess capacity exceeds some threshold. This threshold can be a threshold percentage of total link resources, a threshold absolute resource value (e.g., a number of gigabytes, etc.), a threshold effective resource value (e.g., a number of bytes available to be used by content accounting for overhead needed by various coating and/or modulation schemes, for example, dynamically determined according to present when conditions), etc. For example, only when more than ten percent of the link is available is there determined to be excess capacity. In still other cases, it is determined that excess capacity is presently available only when detected during particular time windows or when more than some threshold is detected. For example, during off-peak hours, any excess capacity (e.g., or excess capacity above a different threshold) that is available is exploited; while during other times, excess capacity is only exploited when more than ten percent of the link is determined to be available.

At stage 928, next-scheduled data from the delaycast queue is scheduled for delivery over the identified communications link as a multicast communication. For example, a multicast service flow (e.g., a delaycast service flow 725) is set up to be communicated within the excess capacity of the identified communications link for receipt by at least the identified set of subscriber terminals. Control information can also be sent (e.g., as part of or separate from the communication) to direct the identified set of subscriber terminals to receive and store the next-scheduled data over the multicast service flow. For example, as each of the identified set of subscriber terminals receives the opportunistically delayed data from the delaycast queue, the data can be stored at the home CDN 125 of each subscriber terminal and GUIs and/or other functionality can be updated, accordingly.

Embodiments of the method 900 use delaycast functionality to handle content objects received at (e.g. intercepted by) a gateway or similar system. These content objects can be received at the gateway in response to an explicit request for the content objects from one or more subscriber terminals, pushing of those content objects from one or more subscriber terminals or content servers, etc. Typically, according to the method 900, delayable content objects can be received and queued while waiting for sufficient excess capacity to manifest on one or more communications links.

In other scenarios, however, it is desirable for the gateway or a similar system to request delayable objects when excess capacity is detected.

Figure 10:
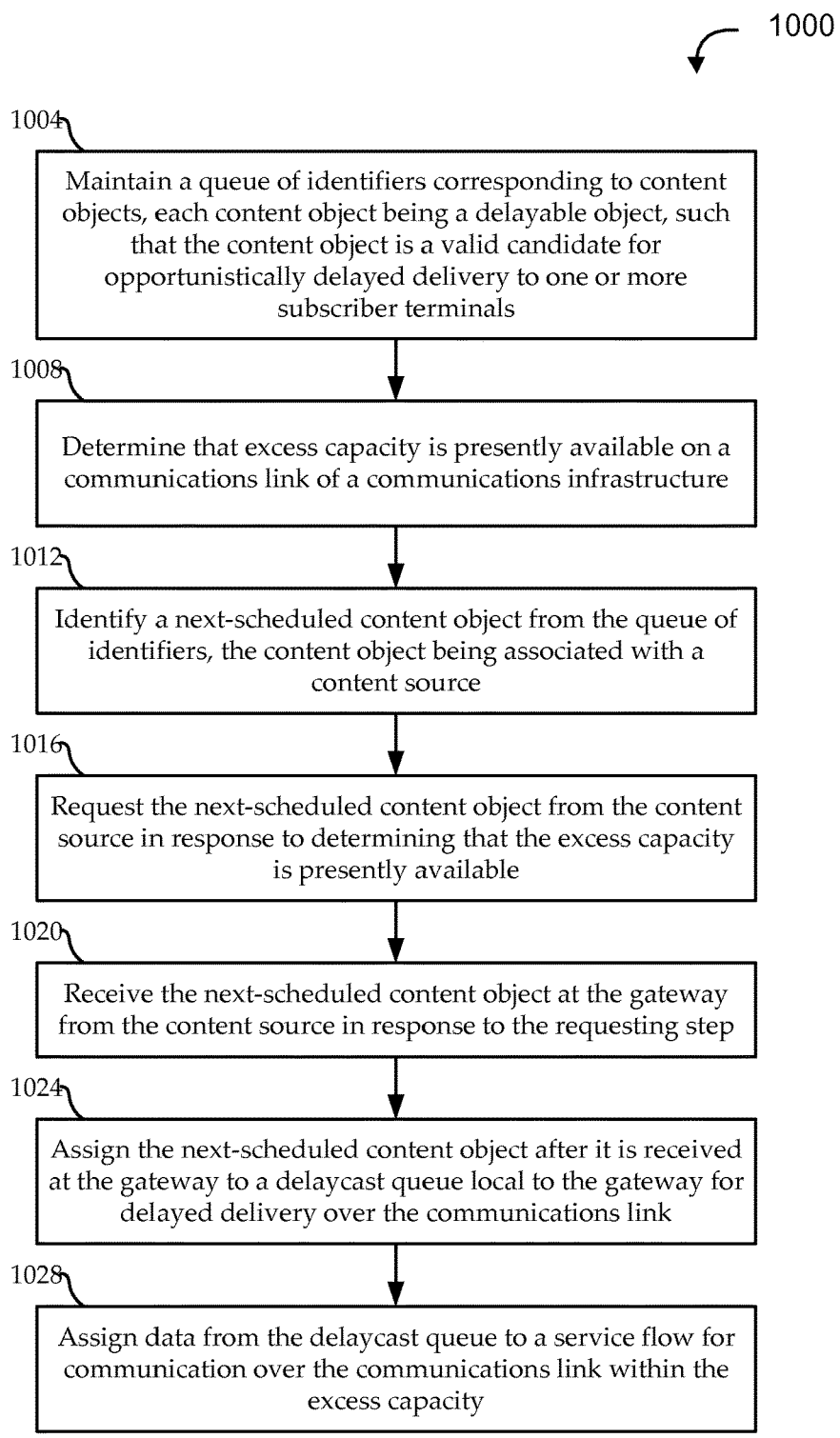
FIG. 10 shows a flow diagram of an illustrative method for exploiting delaycast functionality using gateway-initiated requests for content objects, according to various embodiments.

FIG. 10 shows a flow diagram of an illustrative method 1000 for exploiting delaycast functionality using gateway-initiated requests for content objects, according to various embodiments. Embodiments of the method 1000 began at stage 1004 by maintaining a queue of identifiers at the server system corresponding to content objects. Each corresponding content object is a delayable object in the queue of identifiers is ordered according to some priority. For example, the identifiers in the queue of identifiers can be ordered according to scores attributed to the content objects that correspond to those identifiers.

At stage 1008, the server system determines that excess capacity is presently available on a communications link of the communications infrastructure. In some embodiments, the determination at stage 1008 is similar to the determination made at stage 924 described above with reference to FIG. 9. For example, one or more communications links are actively or passively monitored to determine whether excess capacity is available at all or in excess of some predetermined threshold. At stage 1012, a next-scheduled content object is identified according to the queue of identifiers. The content object can be associated with a content source. In some cases, the content object can be further associated with one or more subscriber terminals, one or more communications links, etc. In some implementations, the next-scheduled content object is identified at stage 1012 in response to the determination that excess capacity is presently available in stage 1008. In other implementations, the next-scheduled content object is identified at stage 1012 as a separate process.

At stage 1016, the server system requests the next-scheduled content object from a content source (e.g., the content source determined to be associated with the content object) in response to determining that the excess capacity is presently available at stage 1008. The requested content object is received at stage 1020 by the server system from the content source in response to the request issued at stage 1016. As the content object is received, or while it is being received, the content object is assigned to a delaycast queue (e.g., a delaycast service flow 725) local to the server system at stage 1024 for opportunistically delayed delivery over the communications link. In some embodiments, the content object is assigned to the delaycast queue at stage 1024 in a similar or identical manner to the assigning of the content object to the delaycast queue described above with reference to stage 912 of FIG. 9. At stage 1028, next-scheduled data from the delaycast queue is scheduled for delivery over the identified communications link as a multicast communication and can be multicast over the communications link, accordingly. In some embodiments, scheduling and/or multicasting of the content object at stage 1028 is similar to the scheduling and/or multicasting of the content object described above with reference to stage 928 of FIG. 9.

Functionality of the method 1000 can be exploited in various contexts. In some such contexts, the server system is used as an explicit requester that determines and requests content objects to be scheduled for opportunistically delayed delivery to one or more user systems. For example, these types of contexts can be used to support anticipatory pre-pushing of content objects to subscribers' home CDNs. In other such contexts, the method 1000 is used to optimize storage resources at the server system and/or to optimize communications resources between the server system and one or more content sources. For example, if it is determined that delivery of a particular content object will be delayed for some time it can be inefficient to use bandwidth resources between the server system and the associated one or more content sources (e.g., backhaul network resources between the server system and content servers or other network nodes) when those bandwidth resources are also potentially being used to satisfy higher priority (e.g., real-time or more immediately desired) content. Similarly, it can be sub-optimal to maintain storage of a content object in the delaycast queue for extended periods of time. Accordingly, techniques described with reference to the method 1000 can be used to request the content objects at a time that is closer to when those content objects will be scheduled for delivery, while still maintaining features associated with delaycasting of those content objects.

The methods disclosed herein comprise one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means, including embodiments of user system 110 and/or server system 140 components, can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A gateway system for delayed content delivery in a communications infrastructure that provides sharing of at least a communications link when communicating with at least some of a plurality of subscriber terminals, the gateway system comprising:
    a content processing subsystem configured to:
        receive a plurality of content objects from a plurality of content sources;
        determine if the content object is a delayable object; and
        assign each content object determined to be a delayable object to a delaycast queue; and
    a communications processing subsystem communicatively coupled with the content processing subsystem and configured to:
        identify next-scheduled data from an associated content object in the delaycast queue;
        determine dynamically that excess capacity is presently available on the communications link; and
        assign the next-scheduled data to a service flow for communication over the communications link within the excess capacity;
    wherein the communications processing subsystem is configured to determine that the excess capacity is presently available on the communications link by:
        determining that more than a predetermined threshold amount of excess capacity is presently available on the communications link,
        wherein the content processing subsystem is configured to assign the next-scheduled data to the service flow for communication over the communications link only when the predetermined threshold amount of excess capacity is presently available on the identified communications link.

2. The gateway system of claim 1, wherein the content processing subsystem is configured to receive the plurality of content objects from the plurality of content sources by intercepting traffic being communicated from the plurality of content sources to the plurality of subscriber terminals over the communications infrastructure.

3. The gateway system of claim 1, wherein the communications processing subsystem is further configured to:
    identify a set of subscriber terminals for delivery of the next-scheduled data and a communications link over which the communications processing subsystem is in communication with the identified set of subscriber terminals;
    determine dynamically that excess capacity is presently available on the identified communications link; and
    multicast the next-scheduled data over the identified communications link within the excess capacity to the identified set of subscriber terminals.

4. The gateway system of claim 1, wherein:
    each content object is destined for at least one destination subscriber terminal of the plurality of subscriber terminals; and
    the communications processing subsystem is further configured to identify a set of subscriber terminals for delivery of the next-scheduled data so that the set of subscriber terminals includes the destination subscriber terminal associated with the content object having the next-scheduled data.

5. The gateway system of claim 1, wherein the content object is a delayable object when the content object is a valid candidate for opportunistically delayed delivery to one or more subscriber terminals.

6. The gateway system of claim 1, wherein the content processing subsystem is configured to analyze each content object to determine if the content object is a delayable object by:
    determining that the content object is a public-type content object.

7. The gateway system of claim 1, wherein the content processing subsystem is configured to analyze each content object to determine if the content object is a delayable object by performing steps comprising:
    deterministically chunking the content object into a plurality of data blocks;
    generating at least one fingerprint from the data blocks;
    comparing the at least one fingerprint to a library of previously generated fingerprints to characterize the content object as a delayable object.

8. The gateway system of claim 7, wherein comparing the at least one fingerprint to the library of previously generated fingerprints to characterize the content object as a delayable object comprises identifying the content object according to the library of previously generated fingerprints.

9. The gateway system of claim 1, wherein the communications processing subsystem is configured to assign the next-scheduled data to a service flow for communication over the communications link within the excess capacity whenever it determines that excess capacity is presently available on the communications link, regardless of the time of day.

10. The gateway system of claim 1, wherein the service flow is a multicast service flow.

11. The gateway system of claim 1, wherein the next-scheduled data represents one or more data blocks of its associated content object.

12. The gateway system of claim 1, wherein:
each content object is destined for at least one destination subscriber terminal of the plurality of subscriber terminals; and
the communications processing subsystem is further configured to identify a set of subscriber terminals for delivery of the next-scheduled data so that the set of subscriber terminals includes the destination subscriber terminal associated with the content object having the next-scheduled data.

13. A gateway system for delayed content delivery in a communications infrastructure that provides sharing of at least a communications link when communicating with at least some of a plurality of subscriber terminals, the gateway system comprising:
a content processing subsystem configured to:
receive a plurality of content objects from a plurality of content sources; determine if the content object is a delayable object; and assign each content object determined to be a delayable object to a delaycast queue; and
a communications processing subsystem communicatively coupled with the content processing subsystem and configured to:
identify next-scheduled data from an associated content object in the delaycast queue;
determine dynamically that excess capacity is presently available on the communications link; and
assign the next-scheduled data to a service flow for communication over the communications link within the excess capacity;
wherein the content processing subsystem is configured to analyze each content object to determine if the content object is a delayable object by:
determining that an object size associated with the content object is above a threshold object size, or
performing steps comprising:
deterministically chunking the content object into a plurality of data blocks;
generating at least one fingerprint from the data blocks;
comparing the at least one fingerprint to a library of previously generated fingerprints to characterize the content object as a delayable object.

14. The gateway system of claim 13, wherein the content processing subsystem is configured to analyze each content object to determine if the content object is a delayable object by:
determining whether the content object is being communicated in response to an explicit request for the content object from at least one of the plurality of subscriber terminals.

15. A gateway system for delayed content delivery in a communications infrastructure that provides sharing of at least a communications link when communicating with at least some of a plurality of subscriber terminals, the gateway system comprising:
a content processing subsystem configured to:
receive a plurality of content objects from a plurality of content sources;
determine if the content object is a delayable object; and
assign each content object determined to be a delayable object to a delaycast queue; and
a communications processing subsystem communicatively coupled with the content processing subsystem and configured to:
identify next-scheduled data from an associated content object in the delaycast queue;
determine dynamically that excess capacity is presently available on the communications link; and
assign the next-scheduled data to a service flow for communication over the communications link within the excess capacity;
wherein the content processing subsystem is configured to prioritize each content object in the delaycast queue according to at least one of an object size of the content object or a popularity of the content object.

16. The gateway system of 15, wherein the communications link is one of a plurality of carriers on one of a plurality of spot beams serviced by the communications infrastructure.

17. The gateway system of claim 15, wherein:
each content object is destined for at least one destination subscriber terminal of the plurality of subscriber terminals; and
the communications processing subsystem is further configured to identify a set of subscriber terminals for delivery of the next-scheduled data so that the set of subscriber terminals includes the destination subscriber terminal associated with the content object having the next-scheduled data.

18. A gateway system for delayed content delivery in a communications infrastructure that provides sharing of at least a communications link when communicating with at least some of a plurality of subscriber terminals, the gateway system comprising:
a content processing subsystem configured to:
receive a plurality of content objects from a plurality of content sources;
determine if the content object is a delayable object; and
assign each content object determined to be a delayable object to a delaycast queue; and
a communications processing subsystem communicatively coupled with the content processing subsystem and configured to:
identify next-scheduled data from an associated content object in the delaycast queue;
determine dynamically that excess capacity is presently available on the communications link; and
assign the next-scheduled data to a service flow for communication over the communications link within the excess capacity;
wherein the communications processing subsystem is configured to:
determine that excess capacity is presently available on the communications link only during one or more predetermined off-peak time windows; and
assign the next-scheduled data to a service flow for communication over the identified communications link within the excess capacity only during the one or more time windows.

19. A gateway system for delayed content delivery in a communications infrastructure that provides sharing of at least a communications link when communicating with at least some of a plurality of subscriber terminals, the gateway system comprising:
a content processing subsystem configured to:
receive a plurality of content objects from a plurality of content sources;
determine if the content object is a delayable object; and
assign each content object determined to be a delayable object to a delaycast queue; and a communications processing subsystem communicatively coupled with the content processing subsystem and configured to:
  identify next-scheduled data from an associated content object in the delaycast queue;
  determine dynamically that excess capacity is presently available on the communications link; and
  assign the next-scheduled data to a service flow for communication over the communications link within the excess capacity;
wherein multicasting the next-scheduled data over the communications link within the excess capacity to the identified set of subscriber terminals comprises directing each of the identified set of subscriber terminals to opportunistically store the next-scheduled data local to the subscriber terminal.

* * * * *